United States Patent [19]

Hara

[11] Patent Number: 5,706,664
[45] Date of Patent: Jan. 13, 1998

[54] HEAT PUMP TYPE AIR CONDITIONER FOR VEHICLE

[75] Inventor: Junichiro Hara, Yokohama, Japan

[73] Assignee: Nissan Motor Co., Ltd., Yokohama, Japan

[21] Appl. No.: 254,048

[22] Filed: Jun. 3, 1994

[30] Foreign Application Priority Data

Jun. 14, 1993 [JP] Japan ............................ 5-142239

[51] Int. Cl.⁶ ........................ F25B 29/00; F25B 41/00; F25B 13/00
[52] U.S. Cl. ........................ 62/159; 62/180; 62/196.4; 62/90; 62/503; 62/176.5; 62/173; 165/240
[58] Field of Search .................... 62/503, 90, 176.5, 62/173, 159, 196.4; 165/240

[56] References Cited

U.S. PATENT DOCUMENTS

| | | | |
|---|---|---|---|
| 3,636,723 | 1/1972 | Kramer | 62/503 |
| 4,761,964 | 8/1988 | Pacheco | 165/240 |
| 5,299,431 | 4/1994 | Iritani et al. | 62/159 |
| 5,355,689 | 10/1994 | Hara et al. | 62/159 |
| 5,375,427 | 12/1994 | Hara et al. | 62/159 |
| 5,419,149 | 5/1995 | Hara et al. | 62/173 |

FOREIGN PATENT DOCUMENTS

| | | | |
|---|---|---|---|
| 1-296056 | 11/1989 | Japan. | |
| 0305264 | 12/1989 | Japan | 62/503 |
| 2-154957 | 6/1990 | Japan | 62/503 |
| 2-290475 | 11/1990 | Japan. | |
| 2-298770 | 12/1990 | Japan | 62/503 |

*Primary Examiner*—John K. Ford
*Attorney, Agent, or Firm*—Lowe, Price, LeBlanc & Becker

[57] ABSTRACT

A heat pump type air conditioner for an automotive vehicle includes a vapor-compression refrigeration system which is provided with a compressor. An outer condenser and an inner condenser are serially connected to the compressor through a three-way valve. A bypass passage of the outer condenser communicates the compressor and the inner condenser through the three-way valve. The inner condenser is connected to an inner evaporator through an expansion valve. A refrigerant heater for heating refrigerant of the system is disposed upstream and/or downstream of the inner evaporator. The refrigerant heater is controllably operated by a control unit according to a refrigerant condition indicative signal from a refrigerant condition detector. Therefore, the air conditioner generates a sufficient heating performance even just after the start of an engine of the automotive vehicle while realizing a dehumidifying heating.

3 Claims, 22 Drawing Sheets

HEAT PUMP TYPE AIR CONDITIONER FOR VEHICLE

BACKGROUND OF THE INVENTION

1. Field of the Invention

The present invention relates to improvements in a heat pump type air conditioner for a vehicle which includes a vapor-compression refrigeration system.

2. Description of the Prior Art

Various heat pump type air conditioners have been proposed and put into practical use for an automotive vehicle. A typical heat pump type air conditioner is provided with a four-way valve for changing refrigerant flow in a heating operation and a cooling operation. During the heating operation, an outer heat exchanger functions as a heat absorber, and an inner heat exchanger functions as a heat radiator. On the other hand, during the cooling operation, the outer heat exchanger functions as a heat radiator and the inner heat exchanger functions as a heat absorber. Such a heat pump type air conditioner is disclosed, for example, in Japanese Patent Provisional Publication No. 2-290475.

As shown in FIG. 21, with the air conditioner disclosed in Japanese Patent Provisional Publication No. 2-290475, during a heating operation, a four-way valve 2 is set as indicated by a continuous line in FIG. 21, and refrigerant is circulated as follows: A compressor 1→the four-way valve 2→a first inner heat exchanger 3→a heating heat exchanger 4→a second inner heat exchanger 5→an expansion valve 6→an outer heat exchanger 7→the four-way valve 2→a receiver 8→the compressor 1. Accordingly, the heat of the refrigerant is transmitted to air led by a blower fan 9 and used for heating a passenger compartment. The heat from an engine 10 is transmitted to the refrigerant through the heating heat exchanger 4 and further transmitted from the refrigerant to air led by a blower fan 11 for heating the passenger compartment. The heat of the air led by a fan 12 is transmitted to the refrigerant through the outer heat exchanger 7. On the other hand, during the cooling operation, the four-way valve 2 is set as indicated by a broken line in FIG. 21 and refrigerant is circulated as follows: The compressor 1→the outer heat exchanger 7→the expansion valve 6→the second inner heat exchanger 5→the first inner heat exchanger 3→the four-way valve 2→the receiver 8→the compressor 1. Accordingly, the heat of the refrigerant discharged from the compressor 1 is radiated into the atmosphere through the outer heat exchanger 7, and the heat of air led by blower fans 9 and 11 is absorbed into the refrigerant through the first and second inner heat exchanger 3 and 5. Therefore, the cooled air is generated at the first and second inner heat exchanger 3 and 5 and is supplied into the passenger compartment. With such a conventional air conditioner, the absorbed heat amount by the outer heat exchanger 7 is decreased during the heating operation under conditions such that the ambient temperature is low. Furthermore, if the workload of the compressor 1 is constant, the radiated heat amount from the first and second inner heat exchangers 3 and 5 which radiates the sum of the heat absorbing amount from the outer heat exchanger 7 is decreased, and therefore the heating capacity of the air conditioner is lowered. Accordingly, this generates a problem such that it takes no little time period until this conventional air conditioner operates normally, that is, it is necessary to use no little time period for a warm-up of the heating operation.

In order to solve such a problem, another heat pump type air conditioner has been proposed, for example, in Japanese Patent Provisional Publication No. 1-296056, in which a heat exchanger for heating refrigerant is disposed at a low pressure side in a refrigeration cycle of this air conditioner and is operated so as to absorb waste heat of a vehicle engine during a heating operation. FIG. 22 shows a construction of this air conditioner. During the heating operation, the four-way valve 2 is set as indicated by a continuous line in FIG. 22, and refrigerant is circulated as follows: A compressor 1→the four-way valve 2→an inner heat exchanger 3→a one-way valve 13A→a second receiver 8B→a one-way valve 13B→a first receiver 8A→a first expansion valve 6A→a heating heat exchanger 4→the compressor 1. Accordingly, the heat of the refrigerant is transmitted to air led by the blower fan 9 and used for heating a passenger compartment. The refrigerant whose temperature is lowered by the heat transmission in the inner heat exchanger 3, is heated in the heating heat exchanger 4 by utilizing the waste heat of the engine and is delivered to the compressor 1. That is, during the heating operation the heating heat exchanger 4 functions as a heat absorber instead of the outer heat exchanger 7, and the inner heat exchanger 3 functions as a heat radiator. On the other hand, during the cooling operation, the four-way valve 2 is set as indicated by a broken line in FIG. 22 and the refrigerant is circulated as follows: The compressor 1→the four-way valve 2→an outer heat exchanger 7→a one-way valve 13C→22 the first receiver 8A→a one-way valve 13D→the second receiver 8B→an expansion valve 6B→the inner heat exchanger 3→the four-way valve 2→the compressor 1. Accordingly, the heat of the refrigerant discharged from the compressor 1 is radiated into the atmosphere through the outer heat exchanger 7, and the heat of air led by a blower fan 9 is absorbed into the refrigerant at the inner heat exchanger 3. That is, during the cooling operation the outer heat exchanger 7 functions as a heat radiator, and the inner heat exchanger 3 functions as a heat absorber.

However, this air conditioner can not solve a problem that it is difficult to obtain a sufficient heating performance just after the start of the engine. Furthermore, since these conventional air conditioners are basically arranged to select one of the cooling and heating operations, it is impossible to simultaneously carry out both cooling and heating operations. That is, a dehumidifying heating operation can not be implemented by these conventional heat pump type air conditioners.

SUMMARY OF THE INVENTION

It is an object of the present invention to provide an improved heat pump type air conditioner for a vehicle which generates a sufficient heating performance even just after the start of an engine of the vehicle, and which can implement a dehumidifying heating operation.

A heat-pump type air conditioner according to the present invention is for an automotive vehicle and comprises a compressor applying workload to refrigerant. An outer heat exchanger is connected to a refrigerant discharge side of the compressor and radiating heat of the refrigerant into ambient air. A blower leads air for air-conditioning a passenger compartment of the vehicle. A heat-radiating inner heat exchanger is connected to the refrigerant discharge side of the compressor and transmitting the heat of the refrigerant to the air led by the blower. An expansion valve is connected to a refrigerant outlet side of the heat-radiating inner heat exchanger. A heat-absorbing inner heat exchanger is connected to a refrigerant outlet side of the expansion valve and a refrigerant suction side of the compressor. The heat-absorbing inner heat exchanger cools the air led by the blower by transmitting the heat of the air to the refrigerant which is supplied through the expansion valve from at least one of the outer heat exchanger and the heat-radiating inner heat exchanger. A switching device is disposed among the refrigerant discharge side of the compressor, a refrigerant inlet side of the outer heat exchanger and a refrigerant inlet side of the heat-radiating inner heat exchanger. The switching valve leads the refrigerant from the compressor to the outer heat exchanger during a cooling operation and leads the refrigerant from the compressor to the heat-radiating inner heat exchanger while bypassing the outer heat exchanger during a heating operation. A refrigerant heating means for heating the refrigerant is disposed to at least one of the refrigerant inlet side and the refrigerant outlet side of the heat-absorbing inner heat exchanger. A refrigerant condition detecting means detects a temperature of the refrigerant. A control means turn on the refrigerant heating means when the temperature of the refrigerant which is detected by the refrigerant condition detecting means is lower than a predetermined value during warm-up operation in heating a mode.

BRIEF DESCRIPTION OF THE DRAWINGS

In the drawings, like reference numerals designate like parts and elements throughout all figures, in which.

DETAILED DESCRIPTION OF THE INVENTION

Referring now to FIGS. 1 to 6, there is shown a first embodiment of a heat pump type air conditioner according to the present invention.

Figure 1:
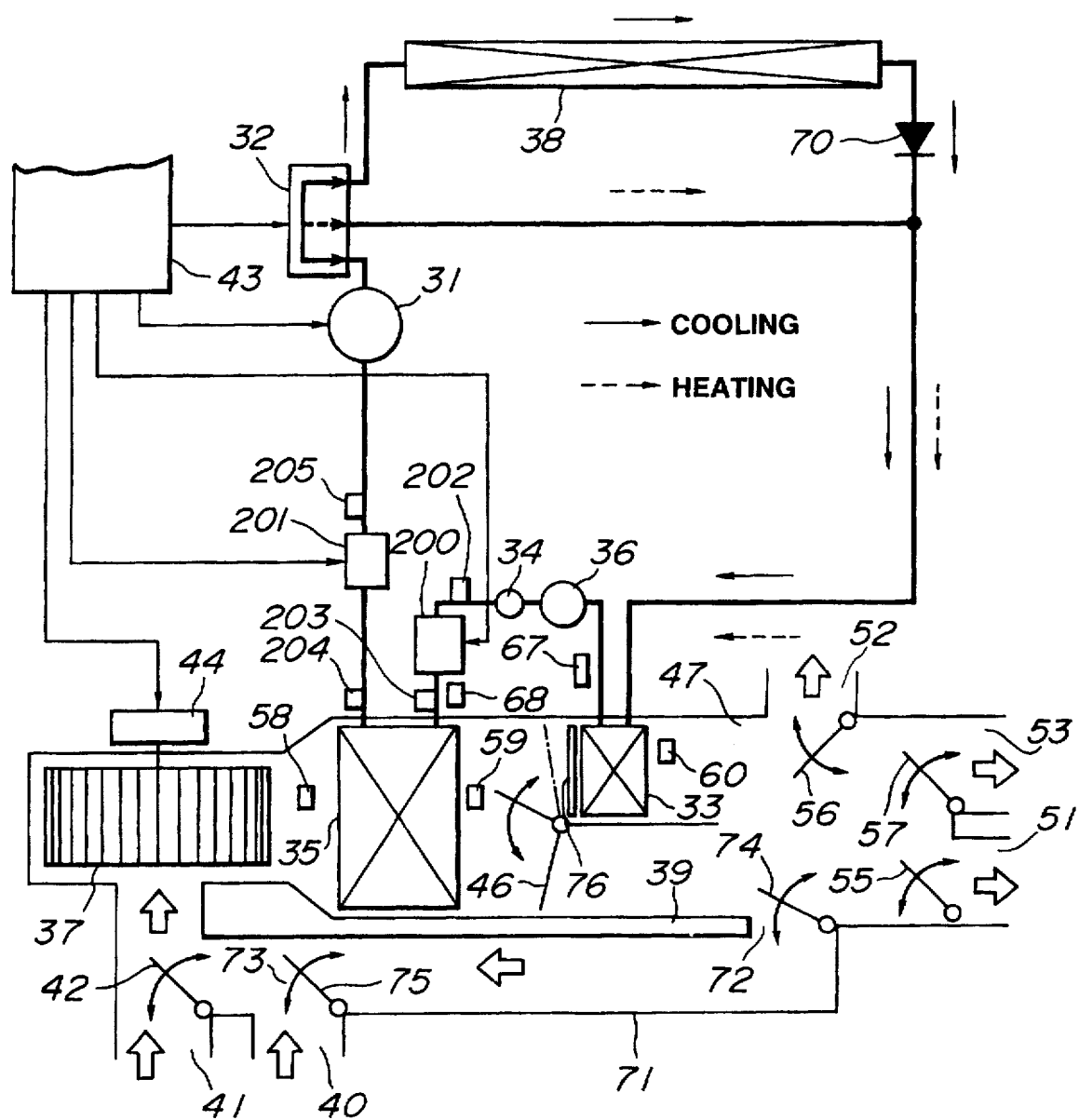
FIG. 1 is a schematic view which shows a structure of a first embodiment of a heat pump type air conditioner according to the present invention.
Figure 2:
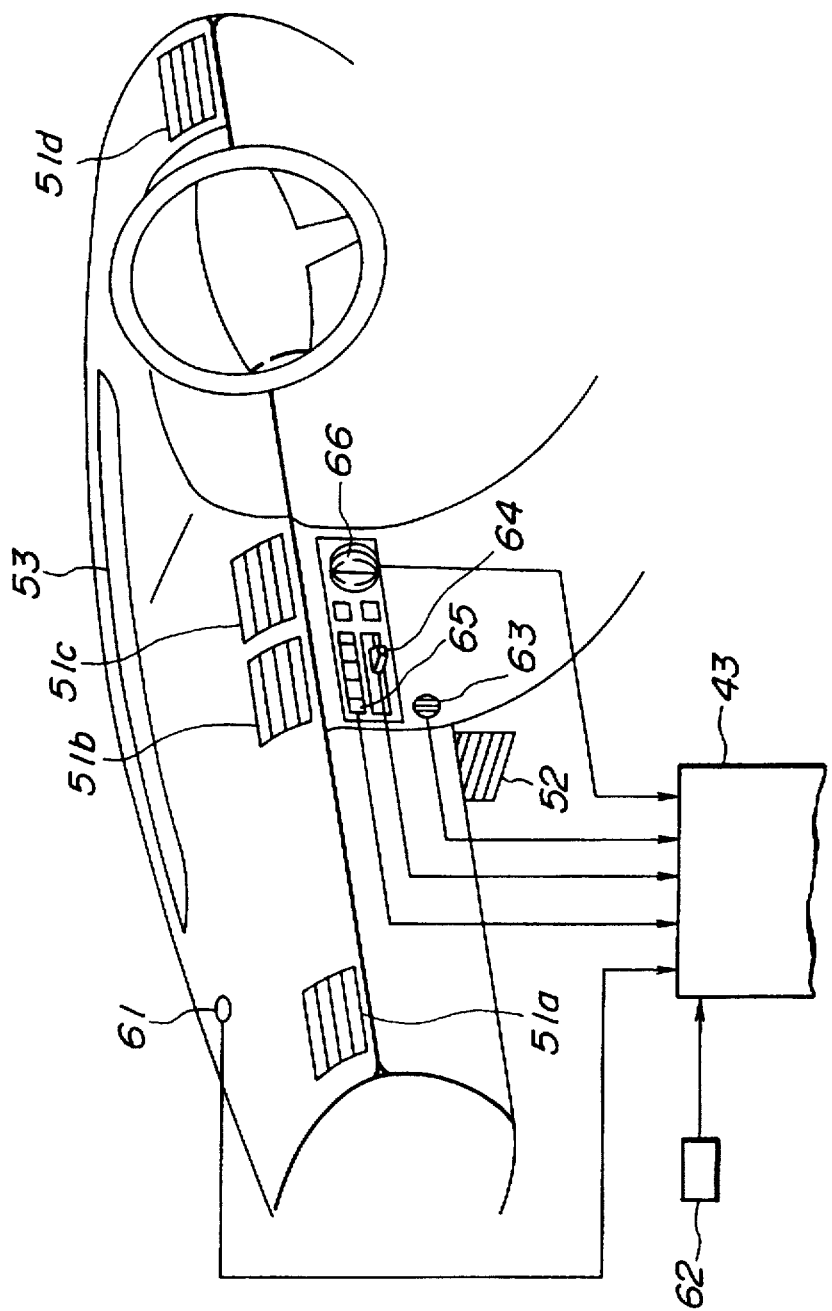
FIG. 2 is a perspective view of an instrument panel to which the air conditioner of FIG. 1 is installed.
Figure 3:
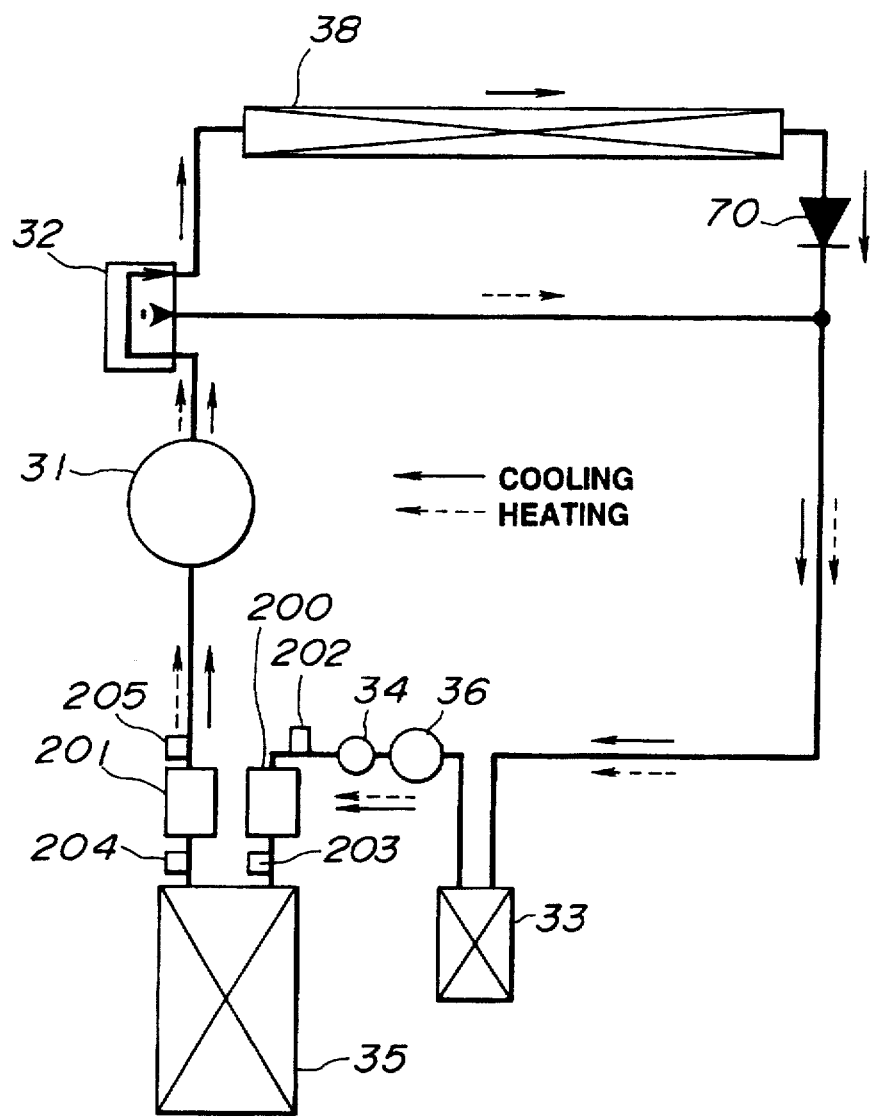
FIG. 3 is a schematic view which shows a refrigeration cycle of the first embodiment of the air condition of FIG. 1.

As shown in FIGS. 1 to 3, the air conditioner is for a vehicle and comprises a refrigeration cycle which includes a compressor 31, a three-way valve 32, an outer heat exchanger 38, a one-way valve 70, a heat-radiating inner heat exchanger 33, a receiver 36, an expansion valve 34, an upstream refrigerant heater 200, a heat-absorbing inner heat exchanger 35, and a downstream refrigerant heater 201.

The compressor 31 is of a type which variably changes an input power according to a signal inputted therein and is of an electric drive type or hydraulic drive type. The compressor 31 is disposed outside of a passenger compartment of the vehicle, such as in an engine room. The three-way valve 32 is connected to a refrigerant discharge side of the compressor 31, and is arranged to select a first position in that the refrigerant is directed to the outer heat exchanger 38 and a second position in that the refrigerant is directed to the heat-radiating inner heat exchanger 33 while bypassing the outer heat exchanger 38. That is, according to the switching of the three-way valve 32, the refrigeration cycle of the air conditioner forms one of a first passage or a second passage. When the three-way valve 32 is set at the first position, the refrigeration cycle of the air conditioner forms the first passage in that the refrigerant flows as follows: The compressor 31→the three-way valve 32→the outer heat exchanger 38→the one-way valve 70→the heat-radiating inner heat exchanger 33→the receiver 36→the expansion valve 34→the upstream refrigerant heater 200→the heat-absorbing inner heat exchanger 35→the downstream refrigerant heater 201→the compressor 31. When the three-way valve 32 is set at the second position, the refrigeration cycle of the air conditioner forms the second passage in that the refrigerant flows as follows: The compressor 31→the three-way valve 32→the heat-radiating inner heat exchanger 33→the receiver 36→the expansion valve 34→the upstream refrigerant heater 200→the heat-absorbing inner heat exchanger 35→the downstream refrigerant heater 201→the compressor 31. When the cooling operation is implemented by the air conditioner of the first embodiment, the first passage is selected by setting the three-way valve 32 at the first position. Further, when the heating operation is implemented by the air conditioner of the first embodiment, the second passage is selected by setting the three-way valve 32 at the second position.

The outer heat exchanger 38 is disposed outside of the passenger compartment and functions as an outer condenser such that the heat of the refrigerant discharged from the compressor 31 is radiated into the atmosphere. The one-way valve 70 is disposed between an outlet side of the outer heat exchanger 38 and an inlet side of the heat-radiating inner heat exchanger 33 and functions so as to prevent the refrigerant from flowing into the outer heat exchanger 38. The heat-radiating inner heat exchanger 33 and the heat-absorbing inner heat exchanger 35 are disposed in a duct 39 which is disposed in front of the passenger compartment, such as a back side of an instrument panel. The heat-radiating inner heat exchanger 33 functions such that heat of the refrigerant discharged from the compressor 31 is radiated into the air directed by the blower fan 37. The heat-absorbing inner heat exchanger 35 functions such that heat of the air directed by the blower fan 37 is radiated into the refrigerant. The receiver 36, the expansion valve 34 and the upstream refrigerant heater 200 are disposed between the heat-radiating inner heat exchanger 33 and the heat-absorbing inner heat exchanger 35. The expansion valve 34 functions as an expansion means for atomizing liquid refrigerant by the adiabatic expansion. Accordingly, in this embodiment, the upstream side of the expansion valve 34 is a high pressure side, and the downstream side thereof is a low pressure side.

A heat-radiating inner heat exchanger outlet-refrigerant temperature sensor 67 is disposed on a conduit connected to the outlet side of the heat-radiating inner heat exchanger 33, and functions to detect an outlet refrigerant temperature $T_{sc.out}$ of the refrigerant at the outlet side of the heat-radiating inner heat exchanger 33. A heat-absorbing inner heat exchanger inlet-refrigerant temperature sensor 68 is disposed between the upstream refrigerant heater 200 and the heat-absorbing inner heat exchanger 35 and functions so as to detect an inlet refrigerant temperature $T_{eva.in}$ of the refrigerant at the inlet side of the heat-absorbing inner heat exchanger 35. Furthermore, first, second, third and fourth thermal-property detectors 202, 203, 204 and 205 are disposed at a refrigerant inlet side and a refrigerant outlet side of the upstream refrigerant heater 200, a refrigerant inlet side and a refrigerant outlet side of the downstream refrigerant heat 201, respectively. The upstream and downstream refrigerant heaters 200 and 201 are of an electric heating type heater, such as a PTC heater, and are disposed inside of the respective connecting pipes. The upstream and downstream refrigerant heaters 200 and 201 are arranged to heat the refrigerant by receiving a voltage in reply to the detected data from the refrigerant thermal-property detectors 202 to 205.

In the duct 39, an inner air inlet 40 for leading the air into the passenger compartment and an outer air inlet 41 for leading outside air due to the wind pressure caused by the running of the automotive vehicle are disposed upstream of the heat-absorbing inner heat exchanger 35. An intake door 42 for properly mixing the air from the inner air inlet 40 and the air from the outer air inlet 41 is disposed at a dividing portion between the inner and outer air inlets 40 and 41 in the duct 39. The intake door 42 is arranged to open and close the outer inlet 41 by using an intake door actuator (not shown) controlled by the control unit 43. The blower fan 37 is disposed downstream of the inner and outer air inlets 40 and 41 and upstream of the heat-absorbing inner heat exchanger 35 in the duct 39 and arranged to be rotated by a blower fan motor 44 controlled by the control unit 43.

An auxiliary heater 76 is disposed at an air inlet side of the heat-radiating inner heat exchanger 33. The auxiliary heater 76 is an electric heater and of a type which variably changes output according to an input voltage controlled by the control unit 43. When the auxiliary heater 76 is turned on, the air passing through the heat-radiating inner heat exchanger 33 is heated, and the temperature of the refrigerant which flows through the heat-radiating inner heat exchanger 33 is increased.

An air mixing door 46 is disposed upstream of the heat-radiating inner heat exchanger 33 in the duct 39. The air mixing door 46 is driven by an air mixing door actuator (not shown) controlled by the control unit 43 so as to change the ratio of air flow rates of cool air and hot air, wherein the cool air is the air which bypasses the heat-radiating inner heat exchanger 33 and the hot air is the air which penetrates through the heat-radiating inner heat exchanger 33. An opening degree $X_d$ of the air mixing door 46 is defined as follows: When the air mixing door 46 is located at a position indicated by a long and short dash line in FIG. 1, that is, when the ratio of the cool air is 100%, the opening degree $X_d$ is defined as 0% (full close condition). When the air mixing door 46 is located at a position indicated by a long and two short dashes line in FIG. 1, that is, when the ratio of the hot air is 100%, the opening degree $X_d$ is defined as 100% (full open condition).

In order to further improve the mixing between cool air and hot air, an air mixing chamber 47 is disposed downstream of the heat-radiating inner heat exchanger 33 in the duct 39. The air mixing chamber 47 has a ventilator outlet 51 for feeding the conditioned air toward an upper side of a vehicle passenger (not shown), a foot outlet 52 for feeding the conditioned air toward a foot portion of the vehicle passenger, and a defroster outlet 53 for feeding the conditioned air toward a front glass (not shown) of the automotive vehicle. A ventilator door 55, a foot door 56, and a defroster door 57 are disposed in the air mixing chamber 47. The ventilator door 55 is arranged to open and close the ventilator outlet 51 according to the operation of a ventilator door actuator (not shown) which is controlled by the control unit 43. The foot door 56 is arranged to open and close the foot outlet 52 according to the operation of a foot door actuator (not shown) which is controlled by the control unit 43. The defroster door 57 is arranged to open and close the defroster outlet 53 according to the operation of a defroster door actuator (not shown) which is controlled by the control unit 43. The ventilator outlet 51 is constituted by center vent. outlets 51b and the 51c and side vent. outlets 51a and 51d.

A circulation passage 71 is disposed to communicate the air mixing chamber 47 and the inner air inlet 40. A circulation door 74 is disposed at an opening 72 of the circulation passage 71 which opening is formed in the vicinity of the air mixing chamber 47 in the duct 39. A switching door 75 is disposed at a branch portion 73 between the circulation passage 71 and the inner air inlet 40. The circulation door 74 is arranged to open and close the opening 72 by means of an inlet door actuator (not shown) which is driven according to a signal from the control unit The switching door 75 is arranged to change a communicating condition of the branch portion 73 by means of an outlet door actuator (not shown) which is driven according to a signal from the control unit 43. That is, the conditioned air is circulated from the air mixing chamber 47 to an upstream side of the blower fan 37 when the circulation door 74 and the switching door 75 are opened wherein the switching door 75 is positioned to close the inner air port 40.

Herein, physical amounts used in the explanation of the embodiments will be defined as follows:

$T_{suc}$ is an inlet air temperature of the heat-absorbing inner heat exchanger 35 and is detected by a heat-absorbing inner heat exchanger inlet-air temperature sensor 58;

$T_{out}$ is an outlet air temperature of the heat-absorbing inner heat exchanger 35 and is detected by a heat-absorbing inner heat exchanger outlet-air sensor 59;

$T_{vsc}$ is an outlet air temperature of the heat-radiating inner heat exchanger 33 and is detected by a heat-radiating inner heat exchanger outlet-air temperature sensor 60;

$T_{vent}$ is an outlet air temperature from the ventilator outlet port 51;

$T_{amb}$ is an air temperature of the outside of the vehicle and detected by an ambient temperature sensor 62;

$T_{ic}$ is an air temperature of the passenger compartment and detected by a room air temperature sensor 63;

$T_{ptc}$ is a preset air temperature of the passenger compartment and is preset by the a room air temperature setting device 64;

$T_{of}$ is a target outlet air temperature of the air conditioner;

$T_{eva\_in}$ is an inlet refrigerant temperature of the heat-absorbing inner heat exchanger 35 and is detected by the heat-absorbing inner heat exchanger inlet-refrigerant temperature sensor 68;

$T_{sc\_out}$ is an outlet refrigerant temperature of the heat-radiating inner heat exchanger 33 and is detected by the heat-radiating inner heat exchanger outlet-refrigerant temperature sensor 67;

$T_s$ is an inlet refrigerant temperature of the compressor 31 and is detected by the refrigerant thermal property detector 205;

Qsun is a solar radiation amount and is detected by a solar radiation amount sensor 61;

$X_d$ is an opening degree of the air mixing door;

$W_{comp}$ is a control signal indicative of an input of the compressor 31;

$V_{fan}$ is a voltage applied to the blower motor 44; and $V_{eva}$ is an air flow rate passing through the heat-absorbing inner heat exchanger 35.

The control unit 43 is constituted by a micro computer, a memory, an A/D converter, an actuator driving circuit and an interface circuit. The control unit 43 is connected to thermal information detecting means such as the inlet air temperature sensor 58 for the heat-absorbing inner heat exchanger 35, the outlet air temperature sensor 59 for the heat-absorbing inner heat exchanger 35, the outlet air temperature sensor 60 for the ventilator outlet 51, the solar radiation sensor 61, the outer air (ambient) temperature sensor 62, the room air temperature sensor 63, the room air temperature setting device 64 which is disposed in an air-conditioner panel 89, an outlet-port mode switch 65, a blower fan switch 66, the outlet-refrigerant temperature sensor 67, and the inlet-refrigerant temperature sensor 68.

The control unit 43 calculates target air-conditioned state, such as the opening degree $X_d$, the input value $W_{comp}$ of the compressor 31, the air flow rate $V_{eva}$ passing through the heat-absorbing inner heat exchanger 35, and the target outlet air temperature $T_{of}$ according to the thermal information from the thermal information detecting means. Furthermore, on the basis of the calculated values, the control unit 43 controls the compressor 31, the blower fan motor 44, the air-mixing door actuator, the return door actuator, the ventilator door actuator, the foot door actuator, and the defroster door actuator such that the air-conditioned state corresponds with the calculated target air-conditioned state. The heat-absorbing inner heat exchanger inlet-air temperature sensor 58 detects the inlet air temperature $T_{nic}$ and sends it to the control unit 43. The heat-absorbing inner heat exchanger outlet-air temperature sensor 59 detects the outlet air temperature $T_{out}$ and sends it to the control unit 43. The heat-radiating inner heat exchanger outlet-air temperature sensor 60 detects the outlet air temperature $T_{vsc}$ and sends it to the control unit 43. The solar radiation sensor 61 detects the solar radiation amount $Q_{sun}$ to the vehicle and sends it to the control unit 43. The ambient air temperature sensor 62 detects the ambient air temperature $T_{amb}$ and sends it to the control unit 43. The room air temperature sensor 63 detects the room air temperature $T_{ic}$ and sends it to the control unit 43. The preset room temperature $T_{ptc}$ set at the room temperature setting device 64 is sent to the control unit 43. The heat-absorbing inner heat exchanger inlet-refrigerant temperature sensor 67 detects the outlet refrigerant temperature $T_{sc\_out}$ of the refrigerant outlet of the heat-radiating inner heat exchanger 33 and sends it to the control unit 43. The heat-absorbing inner heat exchanger inlet-refrigerant temperature sensor 68 detects the inlet refrigerant temperature $T_{eva\_in}$ and sends it to the control unit 43. Such detected data functions as the thermal information.

During the heating operation, the control unit 43 judges according to the target outlet air temperature $T_{of}$ whether it is necessary to rapidly warm the passenger compartment or not. If it is necessary to rapidly warm the passenger compartment, a heating warm-up control is implemented. If not, a normal heating operation is implemented. During the heating warm-up control, on the basis of the difference between the target outlet air temperature $T_{of}$ and the outlet air temperature $T_{vsc}$ of the heat-radiating inner heat exchanger 33, and the difference between the outlet air temperature $T_{out}$ of the heat-absorbing inner heat exchanger 33 and a preset temperature Tset1 for preventing the freezing of the heat-absorbing inner heat exchanger 35, the control unit 43 controls the compressor 31, the refrigerant heaters 200 and 201, the expansion valve 34, the blower motor 44, the auxiliary heater 76, the air mixing door 46, the respective doors 55 to 57 of the outlet ports 50 to 53, the circulation door 74, the switching door 75 and the like, so as to increase the input of the compressor 31 while preventing the freezing of the heat-absorbing inner heat exchanger 35. That is, the control unit 43 implements an operation, such as a temporary lowering of the inlet air flow rate to the heat-radiating inner heat exchanger 33 by controlling the air mixing door 46, a temporary increase of the inlet air temperature of the heat-radiating inner heat exchanger 33 by controlling the auxiliary heater 76, or a temporary decrease of the flowing amount of the refrigerant by controlling the expansion valve 34, in order to avoid the lowering of the refrigerant temperature and to avoid the freezing of the heat-absorbing inner heat exchanger 35.

With reference to flow charts of FIGS. 4 to 6, the manner of controlling operation of the first embodiment of the heat pump type air conditioner according to the present invention will be discussed hereinafter.

Figure 4:
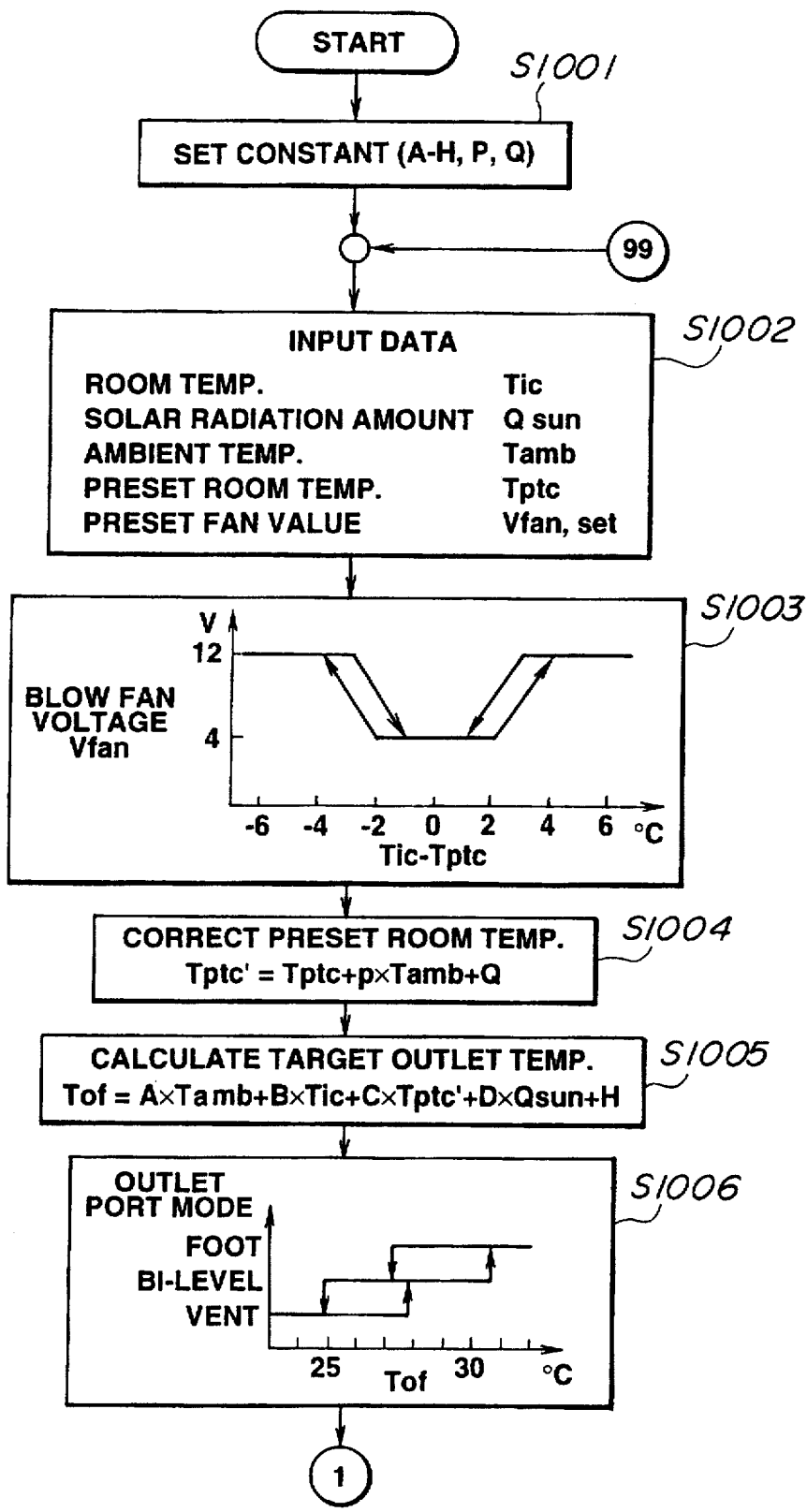
FIG. 4 is a flow chart showing the manner of operation of the first embodiment.

The flow chart in FIG. 4 is started with the start of the control unit 43 which is started by the turn-on of a main switch of the air conditioner. As shown in FIG. 4, in a step S1001, constants A to H, P, and Q are set in the control unit 43. In this program, the constants A to E are applied to an equation by which the target outlet air temperature $T_{of}$ is calculated, the constants F, G, and H are applied to an equation by which the opening degree X of the air mixing door 46 is calculated, and the constants P and Q are used as a correction of the preset room temperature $T_{ptc}$.

In a step S1002, the control unit 43 reads on the outputs from the various sensors (the thermal information detecting means), such as the output signal indicative of the room air temperature $T_{ic}$ from the room air temperature sensor 63, the output signal indicative of the solar radiation $Q_{sun}$ of the solar radiation sensor 61, the output signal indicative of the ambient air temperature $T_{amb}$ of the ambient air temperature sensor 62, the output signal indicative of the preset room air temperature $T_{ptc}$ of the room air temperature setting device 64, and an output signal indicative of a preset value $V_{fan.set}$ set by the fan switch.

In a step S1003, the applied voltage $V_{fan}$ of the blower fan 37 is determined according to a difference $(T_{ic}-T_{ptc})$ between the preset room air temperature $T_{ptc}$ and the room air temperature $T_{ic}$, in order to control the air flow rate caused by the blower fan 37. In concrete terms, as is clear from a graph shown in the step S1003, the applied voltage $V_{fan}$ is increased in accordance with the increase of the difference $(T_{ic}-T_{ptc})$ so as to rapidly approach the room air temperature $T_{ic}$ to the preset room air temperature $T_{ptc}$.

In a step S1004, the correction of the preset room air temperature $T_{ptc}$ is implemented by using the following equation:

$$T'_{ptc}=T_{ptc}+P \times T_{amb}+Q$$

In concrete terms, when the ambient air temperature $T_{amb}$ is low, the preset room air temperature is increased. When the ambient air temperature is high, the preset room air temperature is decreased. This correction is implemented by the following reason: Normally, men feel cool when the room air temperature is lowered under an environment where men feel hot, and feel warm when the room air temperature is increased under an environment where men feel cold. Thus, by correcting the preset room air temperature so as to be in reverse proportion to an environmental temperature, men receive thermal stimulation and obtain amenity.

In a step S1005, the target outlet air temperature $T_{of}$ is calculated by using the following equation:

$$T_{of}=A \times T_{amb}+B \times T_{ic}+C \times T_{ptc}'+D \times Q_{sun}+H$$

where A, B, C, D, and H are constant, $T_{amb}$ is the ambient air temperature, $T_{ic}$ is the room air temperature, $T_{ptc}'$ is a corrected preset room air temperature, and $Q_{sun}$ is the solar radiation amount.

In a step S1006, the outlet-port mode is determined on the basis of the target outlet air temperature $T_{of}$. That is, when the target outlet air temperature $T_{of}$ is high, the FOOT mode is selected so as to feed the conditioned air to passenger's feet. When medium, the BI-LEVEL mode is selected so as to feed the conditioned air to passenger's feet and breast. When low, the VENT mode is selected so as to feed the conditioned air to passenger's beast.

In a step S1007, it is judged whether the blower fan switch 66 is turned on by a passenger or not. When the blower fan switch 66 is turned on, the program proceeds to a step S1008 wherein the value $V_{fan.set}$ is determined as a final value (fan preset value $V_{fan}'=V_{fan.set}$). When the blower fan switch 66 is not turned on, the program proceeds to a step S1009 wherein the value $V_{fan}$ determined in the step S1003 is used as a blower fan voltage $V_{fan}'$ ($V_{fan}'=V_{fan}$).

In a step S1010, the blower fan voltage $V_{fan}'$, which is determined in the step S1008 or step S1009, is outputted to the blower fan motor 44.

In a step S1011, the corresponding signals to the outlet port mode set in the step S1006 are outputted to the door actuators such that the corresponding doors are automatically disposed at predetermined positions, respectively.

Following this, the program proceeds to a step S1012 wherein it is judged which operation mode should be selected. That is, it is judged whether the target outlet air temperature $T_{of}$ is lower than 20° C., higher than 30° C. or neither of them. When the target outlet air temperature $T_{of}$ is lower than 20° C. ($T_{of}$<20° C.), the program proceeds to a step S1013 wherein a cooling mode is selected to implement the cooling operation. When the target outlet air temperature $T_{of}$ is higher than 30° C. ($T_{of}$>30° C.), the program proceeds to a step S1015 wherein a heating mode is selected to implement the heating operation. When the target outlet air temperature $T_{of}$ is not lower than 20° C. and not higher than 30° C. (20° C.$\leq T_{of} \leq$30° C.), the program proceeds to a step S1014 wherein a vent. mode is selected to implement a ventilating operation.

In the step S1013, the three-way valve 32 is switched at the first position such that the first passage is selected in the refrigeration cycle of the air conditioner and the cooling operation is implemented. In the step S1014, the refrigeration cycle of the air conditioner is stopped, and only the air ventilating operation is implemented. Following the step S1014 the program proceeds to a step S1019 wherein the upstream and downstream refrigerant heaters 200 and 201 are turned off. Following this, the program proceeds to a step S1021 wherein the compressor control and the compressor-motor control are implemented to control the input to the compressor 31. After the execution of the step S1021, the program returns to the step S1002 of FIG. 4.

When the cooling mode is selected, as is similar to a normal refrigeration cycle, the refrigerant compressed by the compressor 31 is changed from the gas-phase into the liquid-phase at the outer heat exchanger 38. Then, it is expanded by the expansion valve 34 in a manner of adiabatic expansion and vaporized at the heat-absorbing inner heat exchanger 35. The air directed to the passenger compartment passes through the heat-absorbing inner heat exchanger 35 for cooling and is supplied to the passenger compartment. In addition, since the air conditioner is provided with the heat-radiating inner heat exchanger 33 between the outer heat exchanger 38 and the expansion valve 34 through refrigerant conduits, it is possible to reheat the air cooled at the heat-absorbing inner heat exchanger 35 partially or totally. Accordingly, with this air conditioner, it becomes possible to supply the reheated air and the cooled air to a lower portion and an upper portion of the passenger compartment, respectively, so as to form a head-cool and foot-warm condition. On the other hand, when the ventilation mode is selected, the refrigeration cycle of the air conditioner is not operated and the air of the outside is supplied to the passenger compartment so as to apply an appropriate windy feeling to passengers. After the execution of the step S1013 or S1014, the program proceeds to a step S1019.

In the step S1015 the three-way valve 32 is switched at the second position such that the second passage is selected in the refrigeration cycle of the air conditioner and the heating operation is implemented.

Following the step S1015, the program proceeds to a step S1016 wherein it is judged according to the ambient temperature $T_{amb}$, the room temperature $T_{ic}$, the corrected preset temperature $T_{ptc}$, the target outlet air temperature $T_{of}$ and the like whether the warm-up operation is implemented or not. When the judgment in the step S1016 is "YES", the program proceeds to a step S1017 wherein the inlet refrigerant temperature $T_s$ at the suction side of the compressor 31 is detected by the refrigerant thermal property detector 205. When the judgment in the step S1016 is "NO", the program proceeds to the step S1019 so as to implement a normal heating operation.

Following the step S1017, the program proceeds to a step S1018 wherein the detected inlet refrigerant temperature $T_s$ is compared with the preset standard value $T_{s.set}$. When the inlet refrigerant temperature $T_s$ is lower than the preset standard value $T_{s,set}$ ($T_s < T_{s,set}$), the program proceeds to a step S1020 wherein the upstream and downstream refrigerant heaters 200 and 201 are turned on for heating the refrigerant. That is, in this situation, it is necessary that the air conditioner is quickly operated at a predetermined heating performance. Accordingly, the refrigerant sucked into the compressor 31 which refrigerant will be in a liquid-phase is heated by the upstream and the downstream refrigerant heater 200 and 201. When the inlet refrigerant temperature $T_s$ is higher than or equal to the preset standard value $T_{s,set}$ ($T_s \geq T_{s,set}$), the program proceeds to the step S1019. That is, in this situation, it is not required that the air conditioner is quickly operated at a predetermined heating performance. Accordingly, the upstream and the downstream refrigerant heater 200 and 201 are turned off since the refrigerant sucked into the compressor 31 is in the gas-phase. When one of the cooling mode, the ventilation mode and the normal heating thermal control operation (not warm-up operation) is selected, it is not necessary to quickly ensure a predetermined heating performance. Accordingly, the upstream and downstream refrigerant heaters 200 and 201 are turned off. With the thus arranged air conditioner according to the present invention, the refrigerant is heated by the upstream and downstream refrigerant heaters 200 and 201 installed to the conduits of the inlet and outlet of the heat-absorbing inner heat exchanger 35 when the inlet refrigerant temperature $T_s$ is lower than the standard value $T_{s,set}$. Therefore, even when the engine of the automotive vehicle just has been started, a sufficient heating performance is ensured without lowering the inlet refrigerant temperature $T_s$ to a liquidized temperature. Accordingly, the condition of the passenger compartment is kept comfortable while the generation of window-fogging is avoided. Also, since the refrigerant is sucked into the compressor 31 after it is sufficiently put into a gas-phase condition, the pressure drop at the low-pressure side conduit for the refrigerant is lowered. Accordingly, it becomes possible to quickly raise the pressure in the high-pressure side conduit by the increase of the flow rate of the refrigerant. This enables the sufficient heating performance to be ensured from a time just after the starting of the engine.

Figure 7:
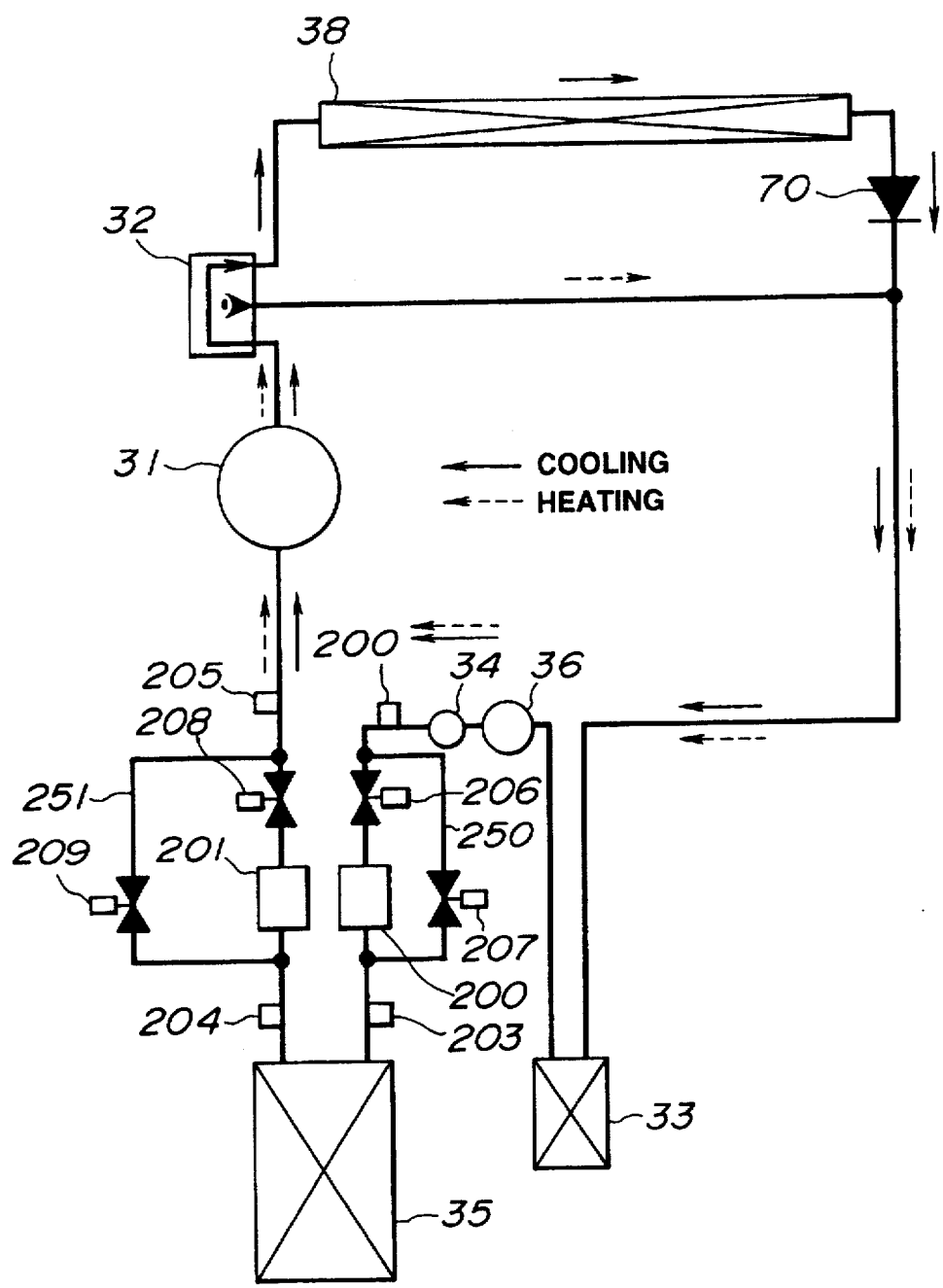
FIG. 7 is a schematic view which shows a refrigeration cycle of a second embodiment of the air conditioner according to the present invention.
Figure 8:
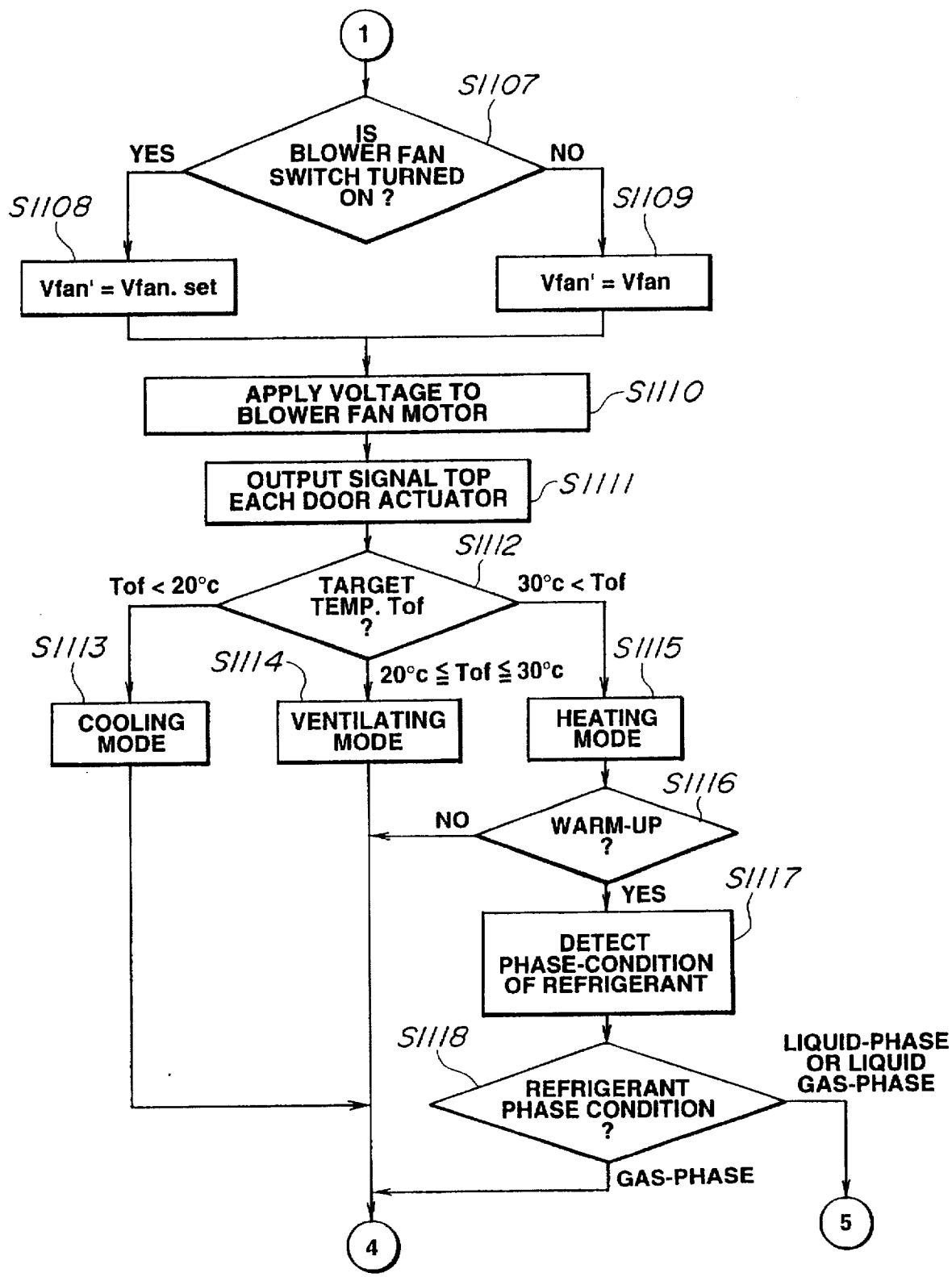
FIG. 8 is a flow chart showing the manner of operation of the second embodiment.
Figure 9:
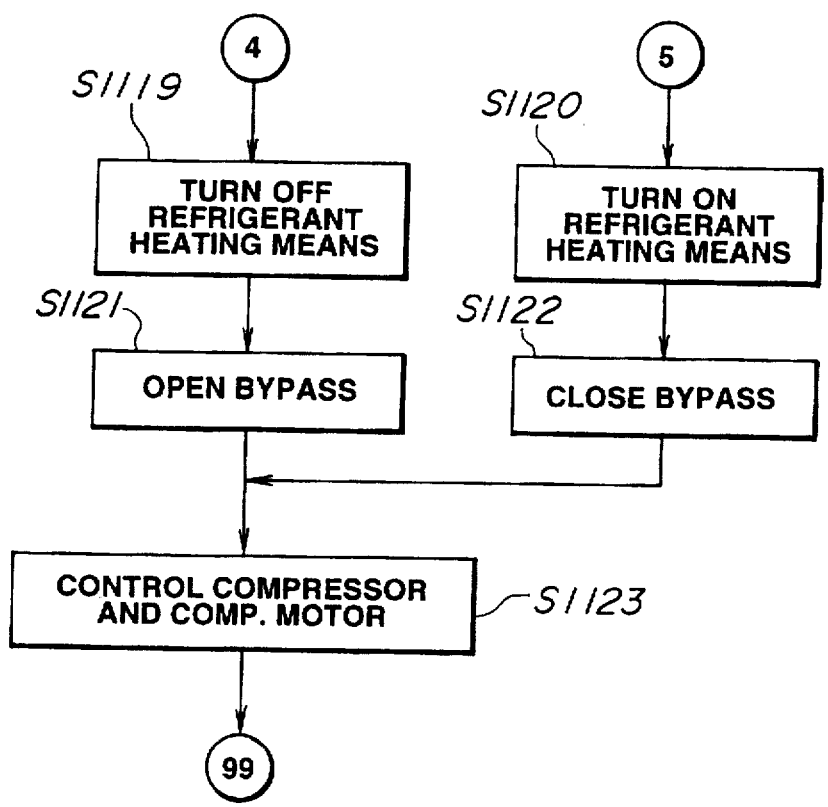
FIG. 9 is a flow chart continued from FIG. 8.

Referring to FIGS. 7 to 9, there is shown a second embodiment of the heat pump type air conditioner according to the present invention.

FIG. 7 shows a refrigeration cycle of the second embodiment. In the second embodiment, an upstream bypass conduit 250 is disposed parallel with the upstream refrigerant heater 200, and a downstream bypass conduit 251 is disposed parallel with the downstream refrigerant heater 201, in addition to the construction of the first embodiment. Further, an upstream main passage valve 206 is disposed upstream of the upstream refrigerant heater 200, and an upstream bypass valve 207 is disposed on the upstream bypass conduit 250. A downstream main passage valve 208 is disposed downstream of the downstream refrigerant heater 201, and a downstream bypass valve 209 is disposed on the downstream bypass conduit 251. The respective valves 206, 207, 208 and 209 are connected to the control unit 43 and controlled for switching the respective refrigerant passages in the refrigeration cycle of the air conditioner. The refrigerant thermal property detector 205 is of an electrostatic-capacity type sensor and detects the phase condition of the refrigerant by utilizing the difference between electrostatic-capacities of the liquid-phase and the gas-phase.

The manner of controlling operation of the second embodiment of the air conditioner will be discussed hereinafter with reference to a flow chart of FIGS. 8 and 9.

As is similar to the first embodiment, the control operation of the second embodiment starts from the flow chart of FIG. 4 and the program of the second embodiment shown in FIG. 8 follows to the flow chart of FIG. 4. Steps S1107 to S1116 in FIG. 8 is completely the same as the steps S1007 to S1016 in FIG. 5. Accordingly, the explanation of the same steps will be omitted. When the judgment in the step S1116 is "YES", that is, when the warm-up control is implemented, the program proceeds to a step S1117 wherein the phase-condition of the refrigerant at the inlet side of the compressor 31 is detected by the refrigerant thermal property detector 205. Following the step S1117, in a step S1118 it is judged according to the detect refrigerant phase-condition whether the refrigerant at the inlet of the compressor 31 is in a gas-phase or in a liquid-phase or gas-liquid mixed phase. When it is judged in the step S1118 that the refrigerant is in the gas-phase, the program proceeds to a step S1119 wherein the upstream and downstream refrigerant heaters 200 and 201 are turned off. Following the step S1119, the program proceeds to a step S1121 wherein the downstream bypass conduit 251 is opened and the flow of the refrigerant into the downstream refrigerant heater 201 is stopped by operating the valves 208 and 209. Then, in a step S1123 wherein the compressor control and the compressor-motor control are implemented to control the input to the compressor 31. When it is judged in the step S1118 that the refrigerant is in the liquid-phase or gas-liquid mixed phase, the program proceeds to a step S1120 wherein the upstream and downstream refrigerant heaters 200 and 201 are turned on. Following the step S1120, the program proceeds to a step S1122 wherein the downstream bypass conduit 251 is closed and the flow of the refrigerant into the downstream refrigerant heater 201 is permitted by operating the valves 208 and 209.

With the thus arranged air conditioner of the second embodiment according to the present invention, the bypass conduits 250 and 251 for bypassing the upward and downward refrigerant heaters 200 and 201 are disposed at the upstream and downstream sides of the heat-absorbing inner heat exchanger 35, respectively. Further, the refrigerant thermal-property detector 205 is arranged so as to detect the phase-condition of the refrigerant sucked into the compressor 31. Accordingly, when the refrigerant is in the gas-phase condition, the refrigerant is flowed to pass through the downward bypass conduit 251 without passing through the downward refrigerant heater 201 in order to heat the refrigerant. When the refrigerant is in the liquid-phase or gas-liquid mixed phase, the refrigerant is flowed to pass through the downstream refrigerant heater 201 without passing through the downstream bypass conduit 251. Accordingly, the refrigerant in the liquid-phase is effectively heated by the downward refrigerant heat 201 so as to be sufficiently vaporized. Furthermore, the refrigerant in the gas-phase passes through the bypass conduit 251 which generates little pressure loss. Therefore, the refrigerant is sucked into the compressor 31 after being sufficiently vaporized, the pressure drop of the low-pressure side passage in the refrigeration cycle is lowered, and the pressure in the high-pressure side in the refrigeration cycle is quickly raised by the increase of the flow rate of the refrigerant. This ensures the sufficient heating performance from a start of the heating operation.

Figure 10:
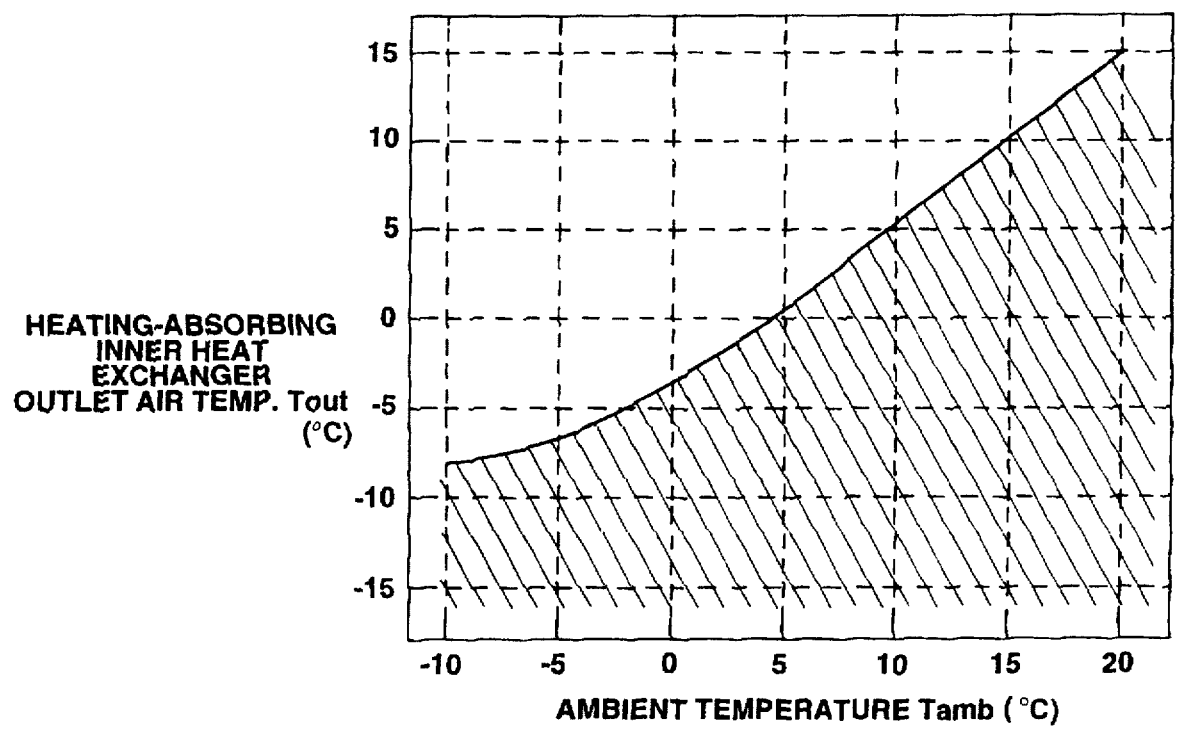
FIG. 10 shows a graph which indicates a determination data for the dehumidified condition of the conditioned air.
Figure 11:
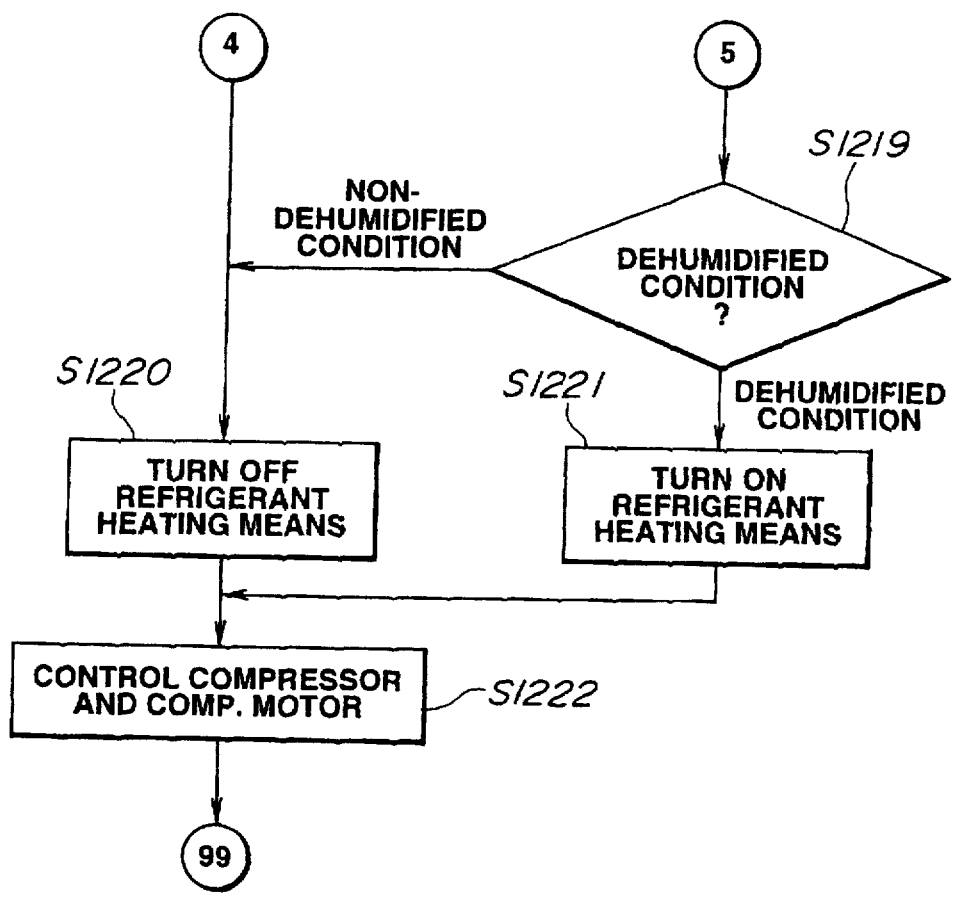
FIG. 11 is a flow chart showing the manner of operation of a third embodiment of the air conditioner according to the present invention.

Referring to FIGS. 10 and 11, there is shown a third embodiment of the heat pump type air conditioner according to the present invention.

This third embodiment is arranged such that the control unit 43 judges the dehumidified condition of the passenger compartment on the basis of the ambient temperature $T_{amb}$ and the outlet air temperature Tout of the heat-absorbing inner heat exchanger 35 and controls the upstream refrigerant heater 200 according to the detected dehumidified condition, when the refrigerant sucked into the compressor 31 is in the liquid-phase or liquid-gas mixed phase. The construction of the third embodiment is the same as that of the first embodiment shown in FIGS. 1 to 3, and therefore the explanation thereof will be omitted.

FIG. 11 shows a graph for deciding the dehumidified condition in the passenger compartment. In this graph, the horizontal line indicates the ambient temperature $T_{amb}$ (° C.), and the vertical line indicates the outlet air temperature $T_{out}$ (° C.) of the heat-absorbing inner heat exchanger 35. When a point decided according to the detected ambient temperature $T_{amb}$ and the detected outlet air temperature $T_{out}$ is positioned within a hatching area in FIG. 11, the control unit 43 judges that the conditioned air is sufficiently dehumidified. On the other hand, when the point decided according to the detected temperatures $T_{amb}$ and $T_{out}$ is out of the hatching area, the control unit 43 judges that the conditioned air is not dehumidified.

FIG. 11 shows a flow chart for controlling the upstream refrigerant heater 200 according to the dehumidified condition of the conditioned air from the air conditioner.

This flow chart is continued from the flow chart of FIG. 8. That is, the program of the third embodiment includes steps S1201 to S1218 which is completely the same as the steps S1101 to S1118 of the second embodiment. When the warm-up control is required and when the refrigerant sucked into the compressor 31 is in the liquid-phase or gas-liquid mixed phase, the program proceeds to a step S1219 wherein the control unit 43 judges the dehumidified condition of the conditioned air. When it is judged in the step 1219 that the conditioned air is dehumidified, the program proceeds to a step S1221 wherein the upstream refrigerant heater 200 is turned on. When it is judged in the step S1219 that the conditioned air is not dehumidified, the program proceeds to a step 1220 wherein the upstream refrigerant heater 200 is turned off. Following the step S1220 or S1221, the program proceeds to a step S1222 wherein the compressor and compressor motor are controlled for the heating operation.

With the thus arranged air conditioner according to the present invention, the upstream refrigerant heater 200 is disposed upstream of the heat-absorbing inner heat exchanger 35, the phase condition of the refrigerant sucked into the compressor 31 is detected by the refrigerant thermal property detector 205, and the control unit 43 detects the dehumidified condition of the conditioned air according to the ambient temperature $T_{amb}$ and the outlet air temperature $T_{out}$ of the heat-absorbing inner heat exchanger 35. Accordingly, when the refrigerant sucked into the compressor 31 is in a liquid-phase or gas-liquid mixed phase, the refrigerant is heated by the upstream refrigerant heater 200. This enables proper heating of the refrigerant while keeping the window-defogging performance in addition to the preferred performance obtained by the first embodiment.

Figure 12:
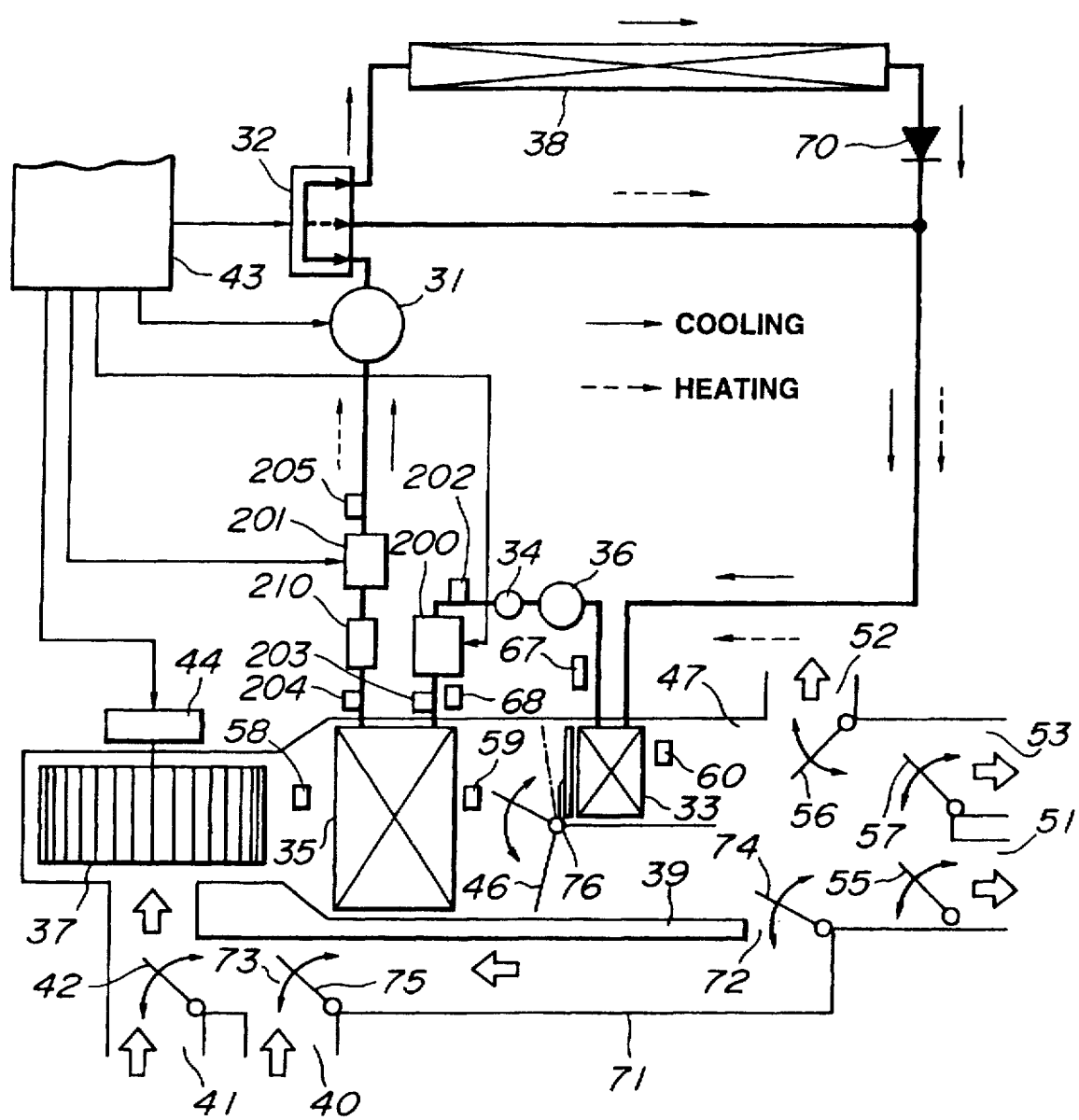
FIG. 12 is a schematic view which shows a construction of a fourth embodiment of the air conditioner according to the present invention.
Figure 13:
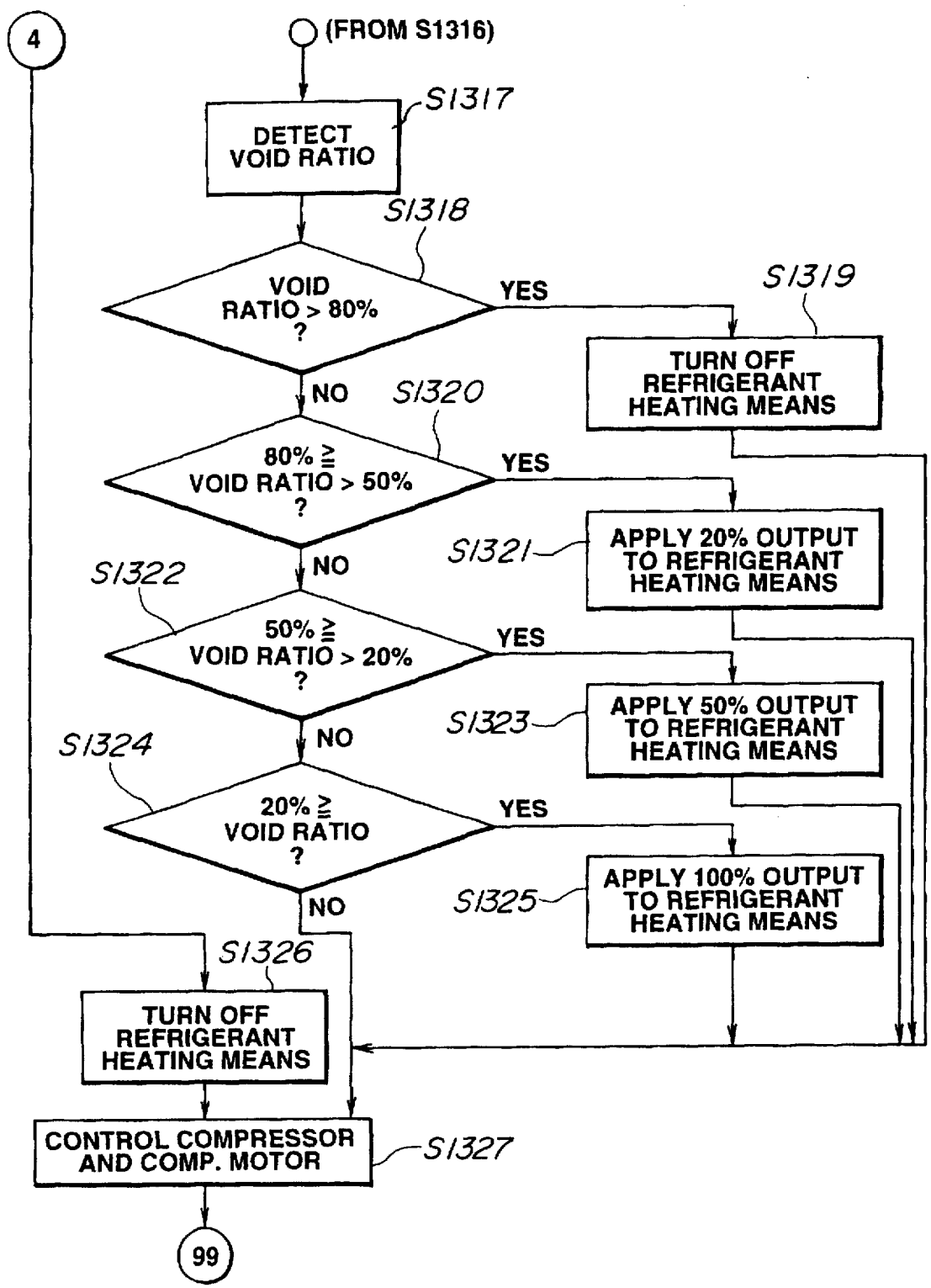
FIG. 13 is a flow chart showing the manner of operation of the fourth embodiment.

Referring to FIGS. 12 and 13, there is shown a fourth embodiment of the air conditioner according to the present invention, in which the heating output of the downstream refrigerant heater 201 is controlled according to the phase condition of the refrigerant.

In this fourth embodiment, as shown in FIG. 12, a refrigerant phase condition detector 210 is installed to a conduit between the heat-absorbing inner heat exchanger 35 and the downstream refrigerant heater 201. The refrigerant phase condition detector 210 detects the ratio between the gas-phase and the liquid-phase of the refrigerant. The ratio of the gas-phase and the liquid-phase is called as a void ratio. When the void ratio is 0%, the refrigerant is perfectly in the liquid-phase. When the void ratio is 100%, the refrigerant is perfectly in the gas-phase. The control unit 43 controls the downstream refrigerant heater 201 according to the void ratio detected from the refrigerant phase-condition detector 210. The other construction of the fourth embodiment is the same as that of the first embodiment. Accordingly, the explanation thereof will be omitted.

FIG. 13 shows a flow chart for controlling the downstream refrigerant heater 201 according to the void ratio of the refrigerant. With reference to the flow chart of FIG. 13, the manner of controlling operation of the fourth embodiment of the air conditioner according to the present invention will be discussed hereinafter.

Figure 5:
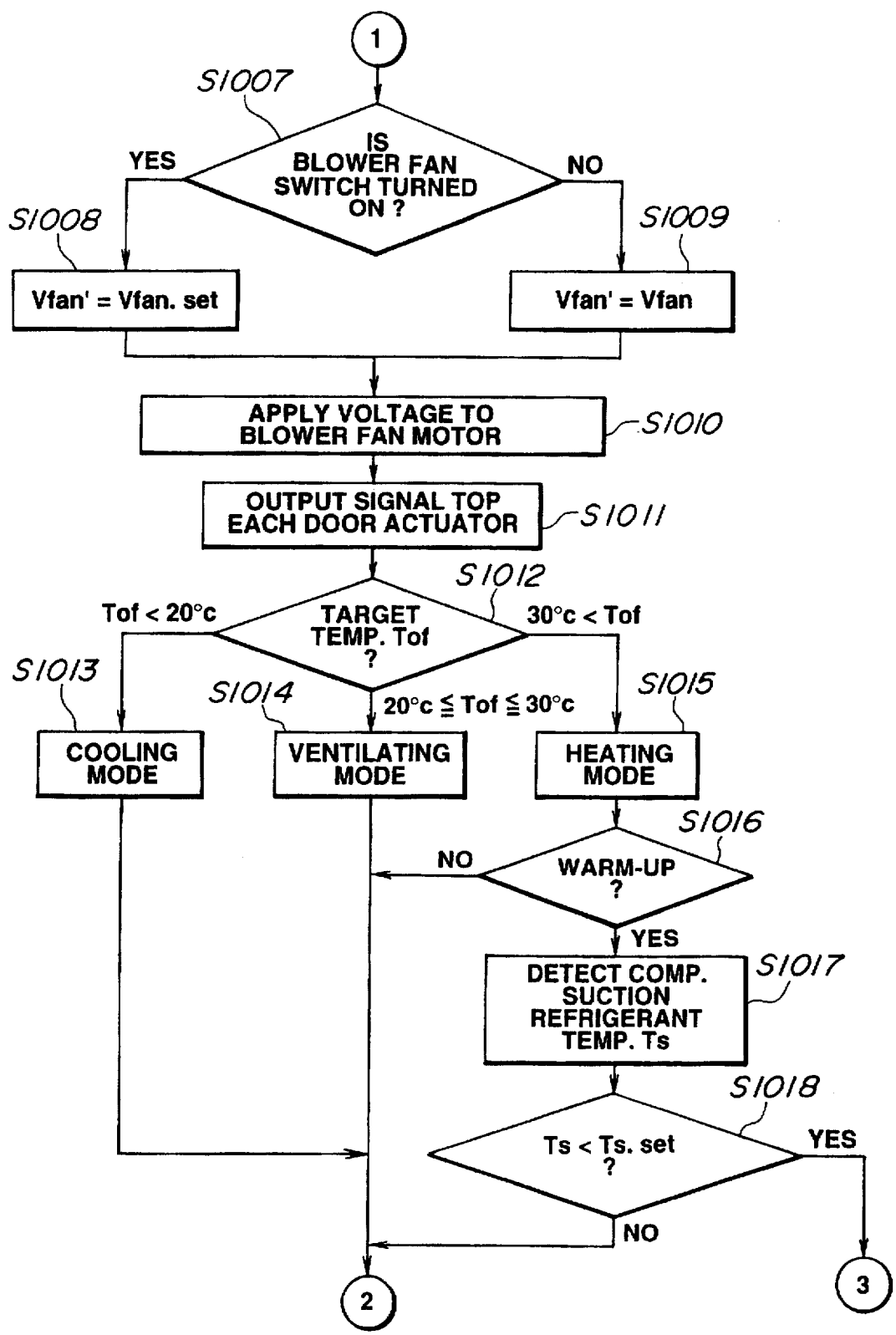
FIG. 5 is a flow chart continued from FIG. 4.
Figure 6:
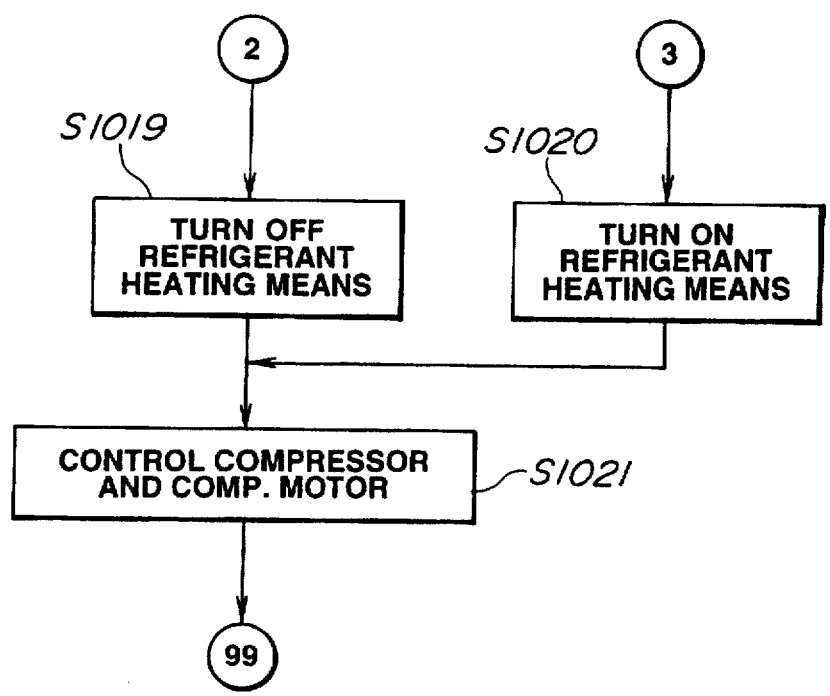
FIG. 6 is a flow chart continued from FIG. 5.

This flow chart is continued from steps S1301 to 1316 which are the same as the steps S1001 to 1016 of FIGS. 4 and 5 although not shown in Figures.

When the warm-up control is required, that is, when the judgment in the step S1316 corresponding to the step S1016 is "YES", the program proceeds to a step S1317 wherein the detection of the void ratio is implemented. Following the step S1317, the program proceeds to a step S1318 wherein it is judged whether the void ratio is greater than 80% or not. When it is judged in the step S1318 that the void ratio is greater than 80%, the program proceeds to a step S1319 wherein the downstream refrigerant heater 201 is turned off. When it is judged in the step S1318 that the void ratio is smaller than or equal to 80%, the program proceeds to a step S1320 wherein it is judged whether the void ratio is within a range from 50% to 80% or not. When it is judged in the step S1320 that the void ratio is within the range from 50% to 80%, the program proceeds to a step S1321 wherein 20% output power is outputted from the downstream refrigerant heater 201. When it is judged in the step S1320 that the void ratio is not within the range form 50% to 80%, the program proceeds to a step S1322 wherein it is judged whether the void ratio is within a range from 20% to 50% or not. When it is judged in the step S1322 that the void ratio is in the range from 20% to 50%, the program proceeds to a step S1323 wherein 50% output power is outputted from the downstream refrigerant heater 201. When it is judged in the step S1322 that the void ratio is not within the range from 20% to 50%, the program proceeds to a step S1324 wherein it is judged whether the void ratio is within a range from 0% to 20% or not. When it is judged in the step S1324 that the void ratio is smaller than or equal to 20%, the program proceeds to a step S1325 wherein 100% output power is outputted from the downstream refrigerant heater 201. When the judgment in the step S1324 is "NO", the program proceeds to a step S1327 wherein the control of the compressor 31 and the compressor motor is implemented. Similarly, after the implementation of the step S1319, S1321, S1323 or S1325, the program proceeds to the step S1327.

In case of the cooling mode, ventilation mode or normal heating in which the warm-up control is not necessary, the program proceeds to a step S1326 wherein the downstream refrigerant heater 201 is turned off. Following the step S1326 the program proceeds to the step S1327.

With the thus arranged air conditioner according to the present invention, the downstream refrigerant heater 201 is disposed downstream of the heat-absorbing inner heat exchanger 35, and the refrigerant phase condition detector 210 is disposed between the heat-absorbing inner heat exchanger 35 and the downstream refrigerant heater 201, such that the output power of the downstream refrigerant heater 201 is varied according to the void ratio detected by the refrigerant phase condition detector 210. Accordingly, it becomes possible to apply heat to the liquid-phase refrigerant without excessively heating the gas-phase refrigerant upon ensuring the merits of the first embodiment.

Figure 14:
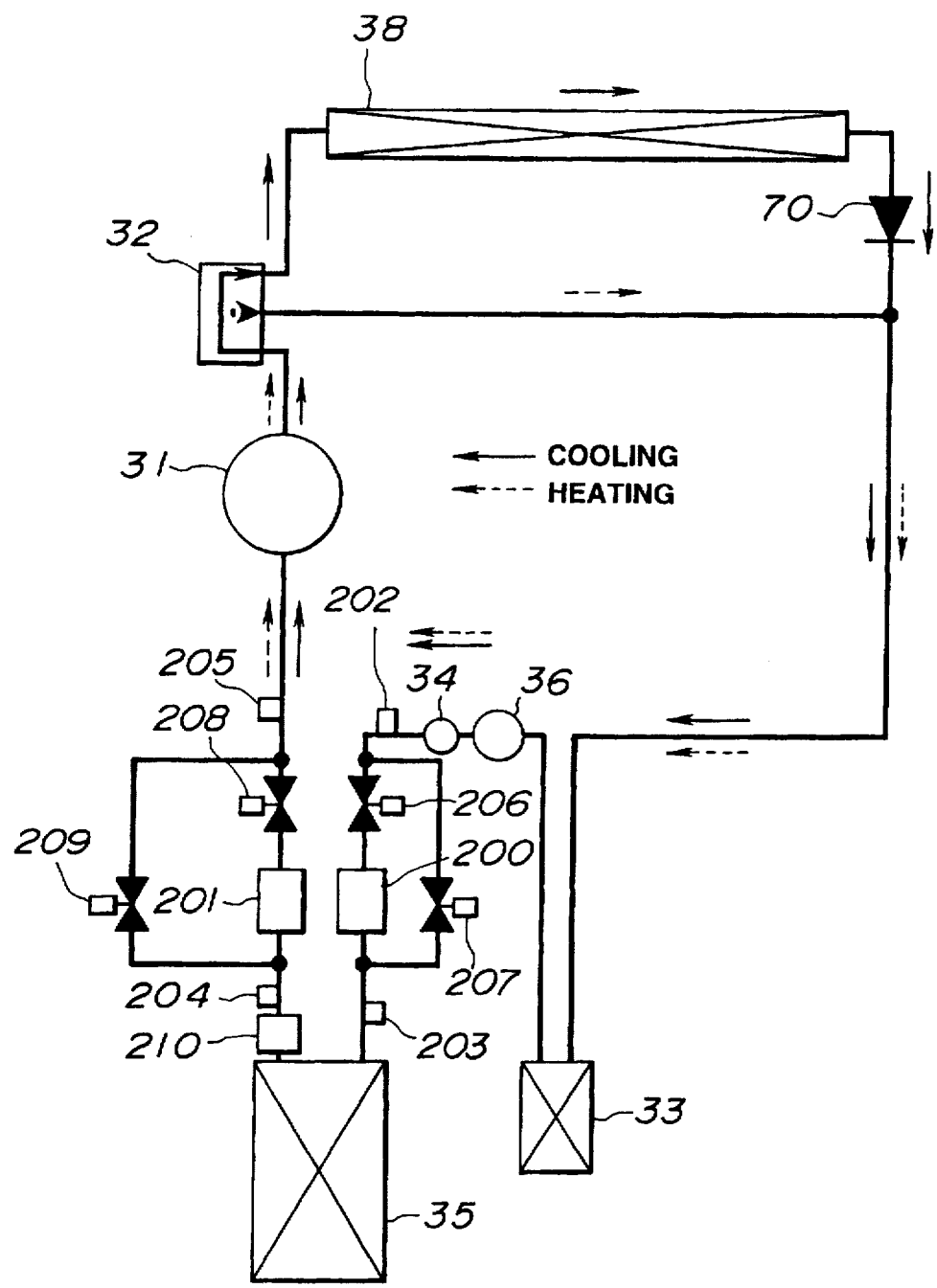
FIG. 14 is a schematic view which shows a refrigeration cycle of a fifth embodiment of the air conditioner according to the present invention.
Figure 15:
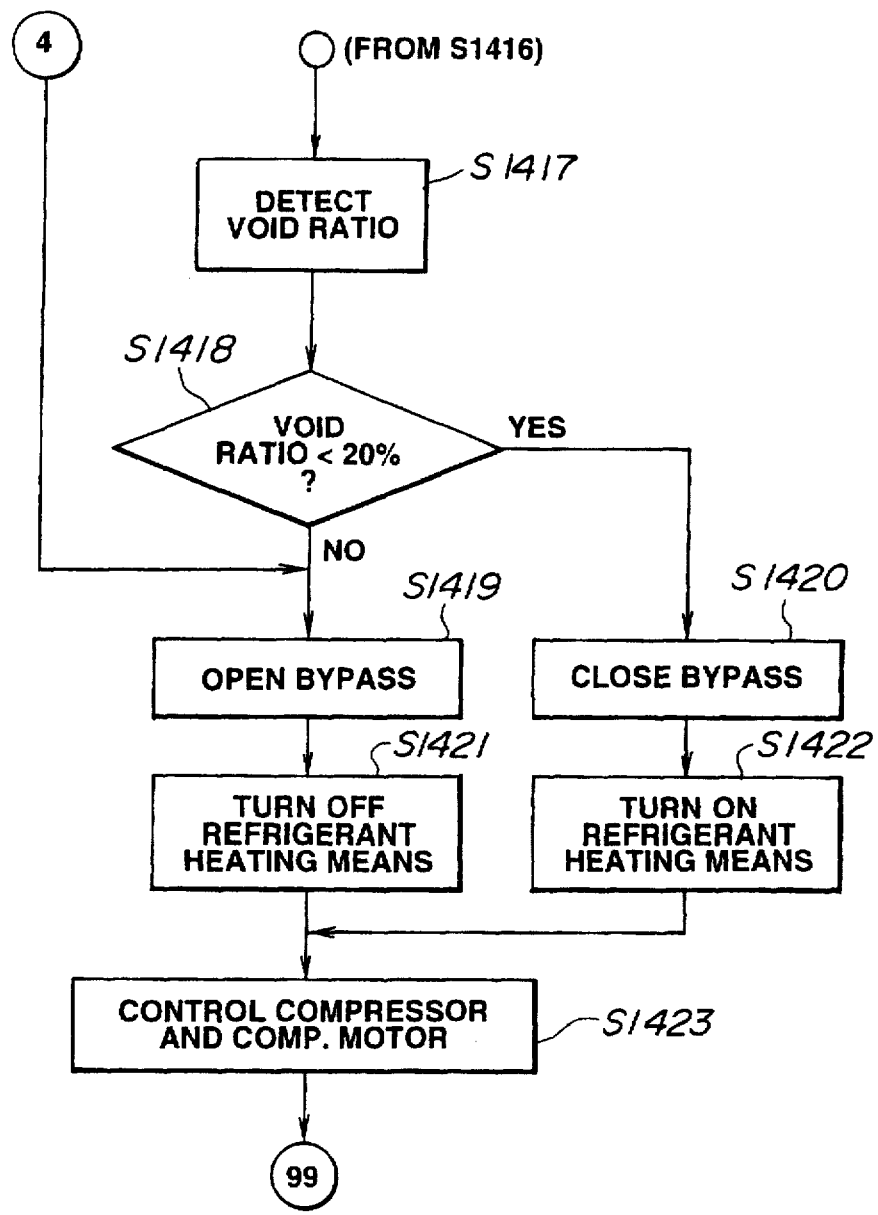
FIG. 15 is a flow chart showing the manner of operation of the fifth embodiment.

Referring to FIGS. 14 and 15, there is shown a fifth embodiment of the heat pump type air conditioner according to the present invention, in which basically the downstream refrigerant heater 201 is controlled according to the phase-condition of the refrigerant sucked into the compressor 31.

FIG. 14 shows a refrigeration cycle of the fifth embodiment of the air conditioner according to the present invention. As is similar to the second embodiment, the upstream bypass conduit 250 is disposed parallel with the conduit for the upstream refrigerant heater 200, and the downstream bypass conduit 251 is disposed parallel with the conduit for the downstream refrigerant heater 201. Further, the upstream main passage valve 206 is disposed upstream of the upstream refrigerant heater 200, the upstream bypass valve 207 is disposed on the upstream bypass conduit 250, a downstream main passage valve 208 is disposed downstream of the downstream refrigerant heater 201 and a downstream bypass valve 209 is disposed on the downstream bypass conduit 251. The respective valves 206, 207, 208 and 209 are connected to the control unit 43 and operated for switching the refrigerant passage in the refrigeration cycle of the air conditioner by the control unit 43. An electrostatic capacity type sensor is used as the refrigerant thermal property detector 205 so as to detect the phase condition of the refrigerant by utilizing the difference of the electrostatic capacity between the liquid phase and the gas phase. Further, the refrigerant phase-condition detector 210 is disposed downstream of the heat-absorbing inner heat exchanger 35. The other construction of the fifth embodiment is the same as that of the second embodiment.

FIG. 15 shows a flow chart for controlling the refrigerant passage according to the void ratio of the refrigerant. With reference to the flow chart of FIG. 15, the manner of controlling operation of the fifth embodiment of the air conditioner according to the present invention will be discussed hereinafter.

The flow chart of FIG. 15 is continued from steps S1401 to 1416 which are the same as the steps S1101 to 1116 of the second embodiment although not shown in Figures.

When the warm-up control is required, that is, when the judgment in the step S1416 corresponding to the step S1116 is "YES", the program proceeds to a step S 1417 wherein the detection of the void ratio is implemented. Following this, it is judged in a step S1418 whether the void ratio is smaller that 20% or not. When it is judged in the step S1418 that the void ratio is smaller than 20%, the program proceeds to a step S1420 wherein the bypass pipe 251 is closed by controlling the selector valves 208 and 209 so as to flow the refrigerant into the downstream refrigerant heater 201. Then, the program proceeds to a step S1422 wherein the downstream refrigerant heater 201 is turned on for heating the refrigerant. That is, when the void ratio is smaller than 20%, the refrigerant seems to be almost all in the liquid-phase. If such refrigerant is sucked into the compressor 31, it may happen some troubles in the compressor 31 due to an abnormal pressure increase. Accordingly, in order to avoid such troubles, the refrigerant to be sucked into the compressor 31 is vaporized by the heating of the downstream refrigerant heater 201.

On the other hand, when it is judged in the step S1418 that the void ratio is not smaller than 20%, the program proceeds to a step S1419 wherein the bypass pipe 251 is opened by controlling the selector valves 208 and 209 so as to flow the refrigerant into the downstream bypass conduit 251. Then, the program proceeds to a step S1421 wherein the downstream refrigerant heater 201 is turned off. That is, when the void ratio is not smaller that 20%, the refrigerant is in the gas-liquid mixed phase. Accordingly, it is not necessary to heat the refrigerant to be sucked into the compressor 31.

After the execution of the step S1421 or S1422, the program proceeds to a step S1423 wherein the control of the compressor 31 and the compressor motor is implemented.

Although the refrigerant passage is arranged such that the refrigerant selectively flows one of the downstream refrigerant heater 201 or the bypass pipe 251, it will be understood that the refrigerant passage may be arranged such that the refrigerant variably flows both the downstream refrigerant heater 201 and the bypass pipe 251.

With the thus arranged air conditioner according to the present invention, the flow rate of the refrigerant to the bypass pipe 251 is increased according to the increase of the ratio of the gas-phase of the refrigerant, and the flow rate of the refrigerant to the downstream refrigerant heater 201 is increased according to the increase of the ratio of the liquid-phase of the refrigerant. Accordingly, the gas-phase refrigerant flows through the bypass pipe with small pressure drop, and the liquid-phase refrigerant is vaporized by the heating of the downstream refrigerant heater 201. As a whole, the refrigerant is sucked into the compressor 31 after sufficiently vaporized, the pressure drop in the low-pressure side in the refrigerant cycle is lowered, and the pressure of the high-pressure side is rapidly raised by the increase of the refrigerant flow rate. Therefore, a sufficient heating performance can be ensured from the start of the engine.

Figure 16:
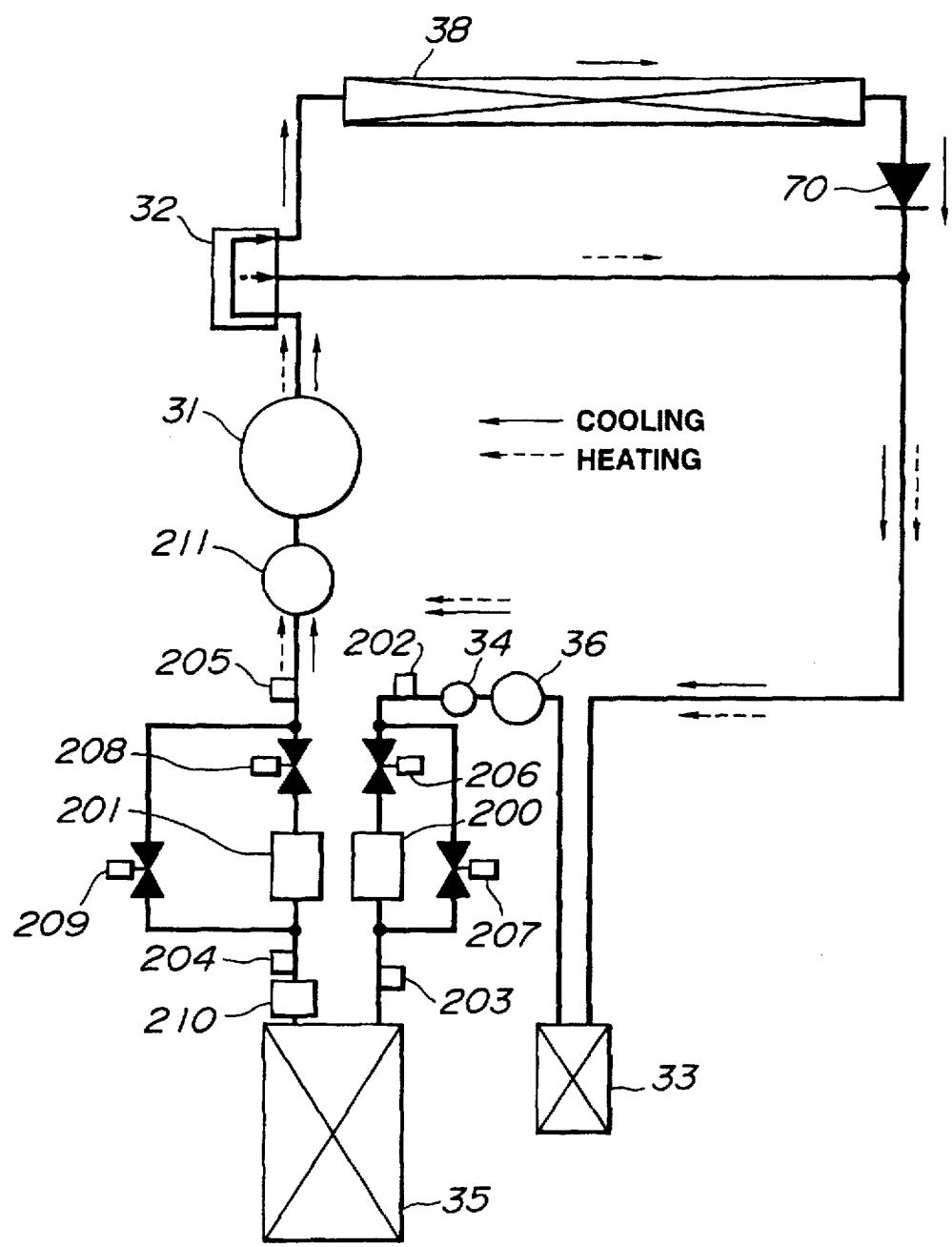
FIG. 16 is a schematic view which shows a refrigeration cycle of a sixth embodiment of the air conditioner according to the present invention.
Figure 17:
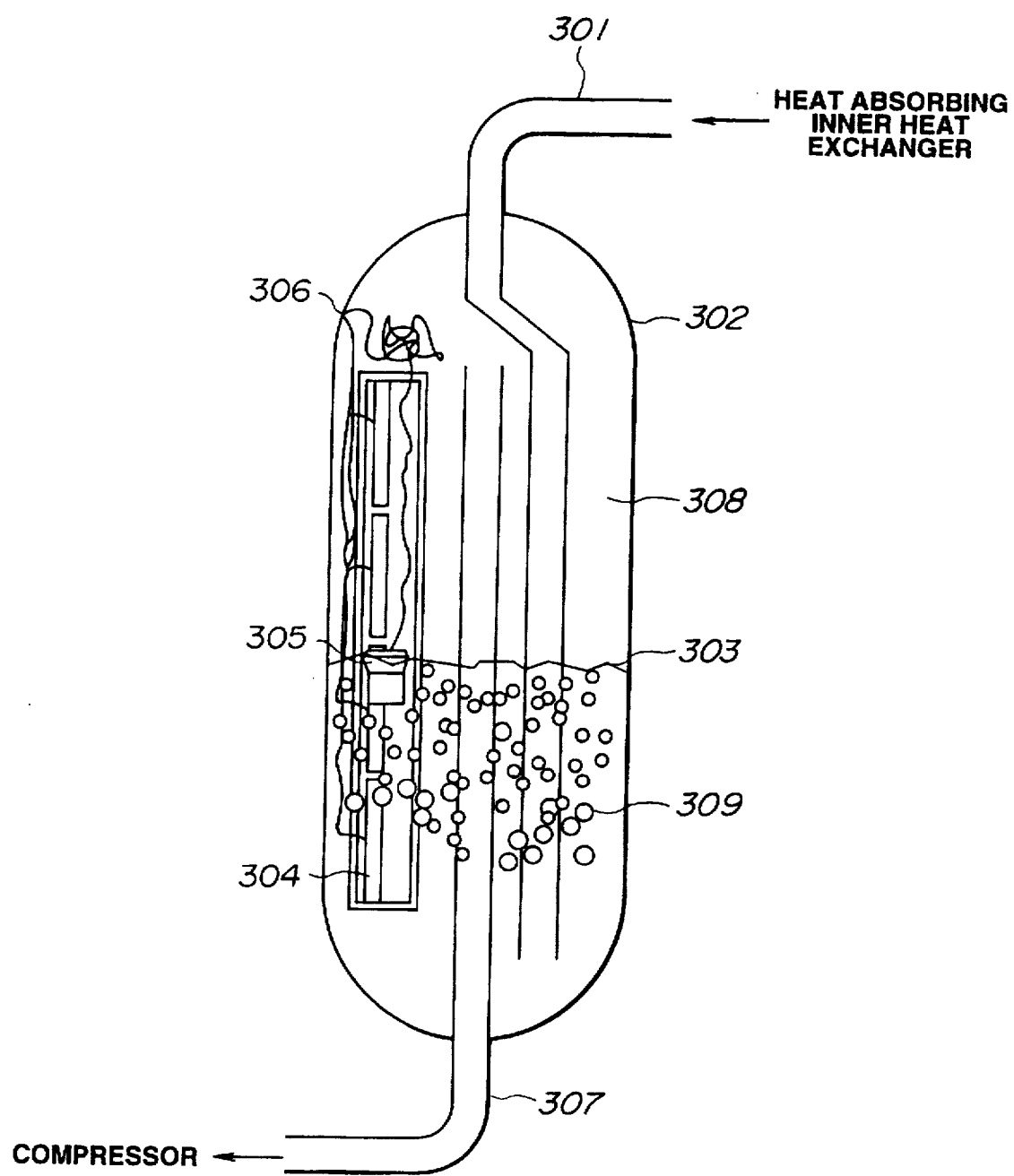
FIG. 17 is a cross-sectional view of an accumulator applied to the sixth embodiment.
Figure 18:
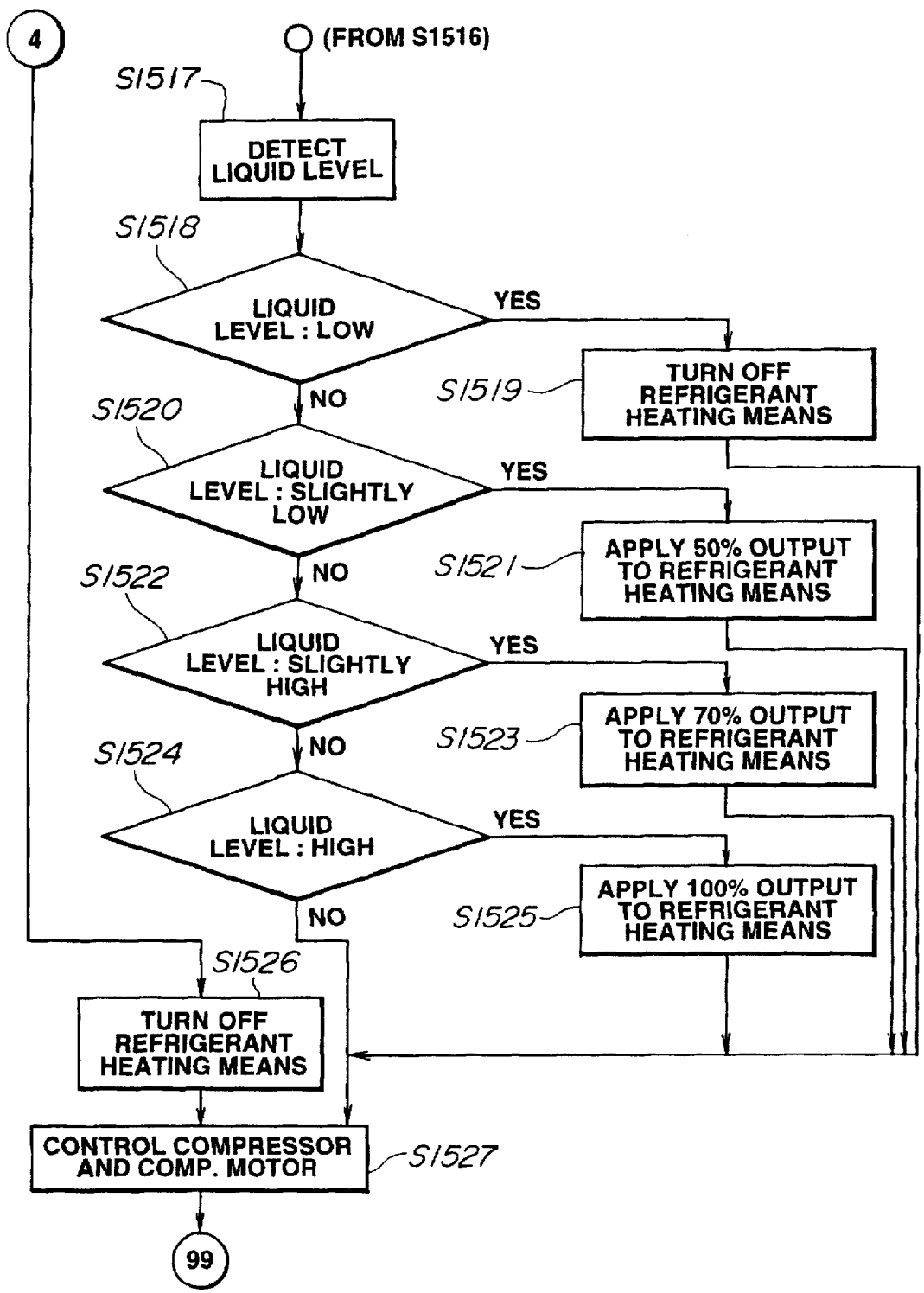
FIG. 18 is a flow chart showing the manner of operation of the sixth embodiment.

Referring to FIGS. 16 to 18, there is shown a sixth embodiment of the air conditioner according to the present invention, in which an accumulator 211 is added to the construction of the fifth embodiment. The accumulator 211 is disposed at the suction side of the compressor 31 and functions as a pressure container for delivering the gas-phase refrigerant to the compressor 31.

As shown in FIG. 17, the refrigerant from the heat-absorbing inner heat exchanger 35 is delivered to a lower portion in a pressure container 302 through an inlet conduit 301. The inlet conduit 301 is embedded into the pressure container 302 such that an end portion of the inlet conduit 301 is located at a lower portion in the pressure container 302. Both of the gas-phase refrigerant and the liquid-phase refrigerant are in the pressure container 302, and the liquid level of the refrigerant changes according to the void ratio in the pressure container 302. That is, when the void ratio is increased, the liquid level of the refrigerant is lowered in the accumulator 211. When the void ratio is decreased, the liquid level of the refrigerant is raised. An electrode 304 of a 4-divided type and an electrode float 305 are disposed in the pressure container 302 in order to detect the liquid level 303, and are arranged such that the electrode float 305 slides along the electrode 304 and is in contact with a part of the electrode 304 corresponding to the liquid level 303, and that the control unit 43 receives a signal indicative of the liquid level 303 through an electrode wiring 306. That is, when the electrode float 305 is electrically in contact with a lowest part of the 4-divided electrode 304, the control unit 43 receives a signal indicative that the liquid level 303 is low. When the electrode float 305 is in contact with a second lower part of the 4-divided electrode 304, the control unit 43 receives a signal indicative that the liquid level 303 is slightly low. When the electrode float 305 is in contact with a second higher part of the 4-divided electrode 304, the control unit 43 receives a signal indicative that the liquid level 303 is slightly high. When the electrode float 305 is in contact with a highest part of the 4-divided electrode 304, the control unit 43 receives a signal indicative that the liquid level 303 is high.

An outlet conduit 307 is embedded in the pressure container 302 such that an end of the outlet conduit 307 is located at an upper portion in the pressure container 302.

With reference to a flow chart of FIG. 18, the manner of controlling operation of the sixth embodiment will be discussed hereinafter.

This flow chart is continued from steps S1501 to S1516 (not shown) which are the same as the steps S1101 to S1116 of the second embodiment. As shown in FIG. 18, following to the step S1516, in a step S1517 the liquid level of the refrigerant is detected. In a step S1518 it is judged whether the liquid level 303 is low or not. When the judgment in the step S1518 is "YES the program proceeds to a step S1519 wherein the downstream refrigerant heater 201 is turned off. That is, it is not necessary to heat the refrigerant since the refrigerant in the accumulator 201 is generally in the gas-phase. When the judgment in the step S1518 is "NO", the program proceeds to a step S1520 wherein it is judged whether the liquid level 303 is slightly low or not. When the judgment in the step S1520 is "YES", the program proceeds to a step S1521 wherein 50% output power is outputted from the downstream refrigerant heater 201. When the judgment in the step S1520 is "NO", the program proceeds to a step S1522 wherein it is judged whether the liquid level is slightly high or not. When the judgment in the step S1520 is "YES", the program proceeds to a step S1523 wherein 70% output power is outputted from downstream refrigerant heater 201. When the judgment in the step S1522 is "NO", the program proceeds to a step S1524 wherein it is judged whether the liquid level 303 is high or not. When the judgment in the step S1524 is "YES", the program proceeds to a step S1525 wherein 100% output power is outputted from the downstream refrigerant heater 201. When the judgment in the step S1525 is "NO", the program proceeds to a step S1527 wherein the control of the compressor 31 and the compressor motor is implemented. Similarly, after the execution of the step S1519, S1521, S1523 or S1525 the program proceeds to the step S1527.

In case of the cooling mode, ventilation mode or normal heating in which the warm-up control is not necessary, the program proceeds to a step S1526 wherein the downstream refrigerant heater 201 is turned off. Following the step S1526 the program proceeds to the step S1527.

With the thus arrange air conditioner according to the present invention, the phase condition of the refrigerant sucked into the compressor 31 is detected according to the liquid level 303 in the accumulator 211. Accordingly, it becomes possible to finely detect the phase condition of the refrigerant without large increasing the production cost.

Figure 19:
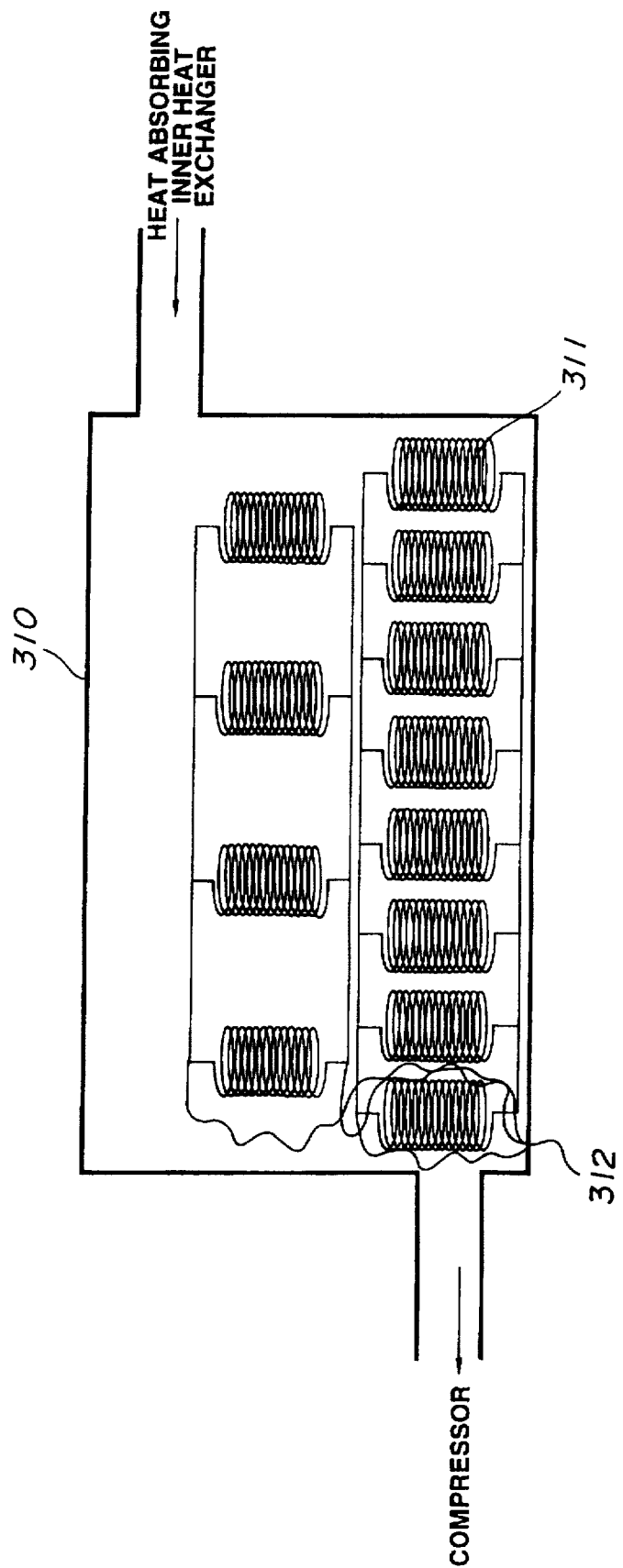
FIG. 19 is a cross-sectional view of a refrigerant heater unit applied to a seventh embodiment of the air conditioner according to the present invention.

Referring to FIG. 19, there is shown a seventh embodiment of the air conditioner according to the present invention. The construction of the seventh embodiment is generally the same as that of the first embodiment except that a heating container 310 are disposed downstream of the heat-absorbing inner heat exchanger 35 instead of the upstream and downstream refrigerant heaters 200 and 201.

As shown in FIG. 19, a plurality of PTC heaters 311 for heating the refrigerant are concentratedly disposed at a lower portion of the container 310 of the refrigerant heater unit as shown in FIG. 19 and arranged to receive driving electric power through a heater wiring 312. Since the liquid-phase refrigerant is flowed toward a lower portion of the container 310 from the heat-absorbing inner heat exchanger 35, the refrigerant is effectively heated by the PTC heaters 311. On the other hand, the gas-phase refrigerant passes through an upper portion of the container 310 and is delivered to the compressor 31 without contacting with the PTC heaters 311.

Accordingly, since only the liquid-phase refrigerant is heated by the PTC heaters 311 and vaporized, the heating energy is effectively utilized and a vaporizing process of the refrigerant is effectively implemented.

Figure 20:
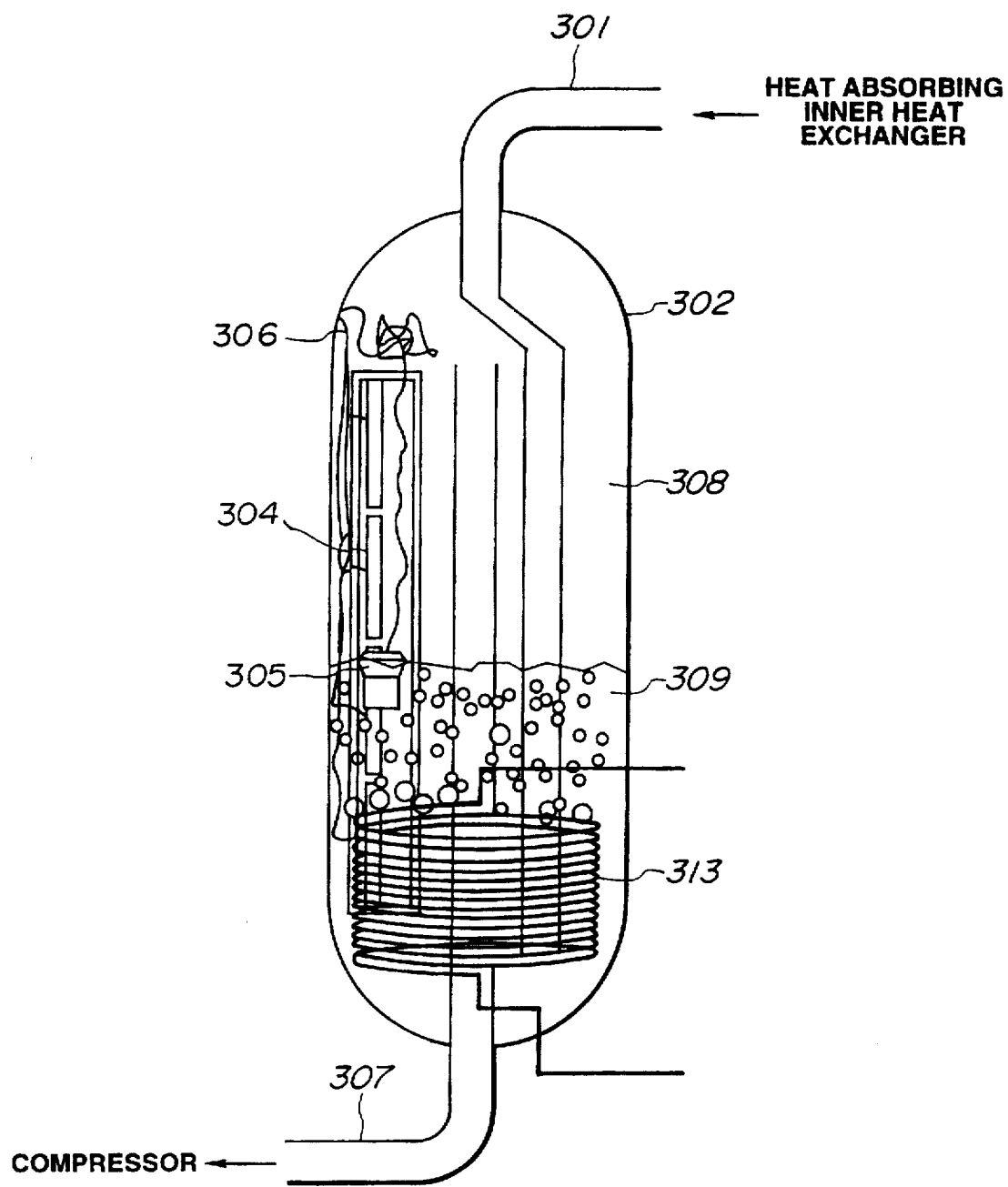
FIG. 20 is a cross-sectional view of an accumulator applied to an eighth embodiment of the air conditioner according to the present invention.
Figure 21:
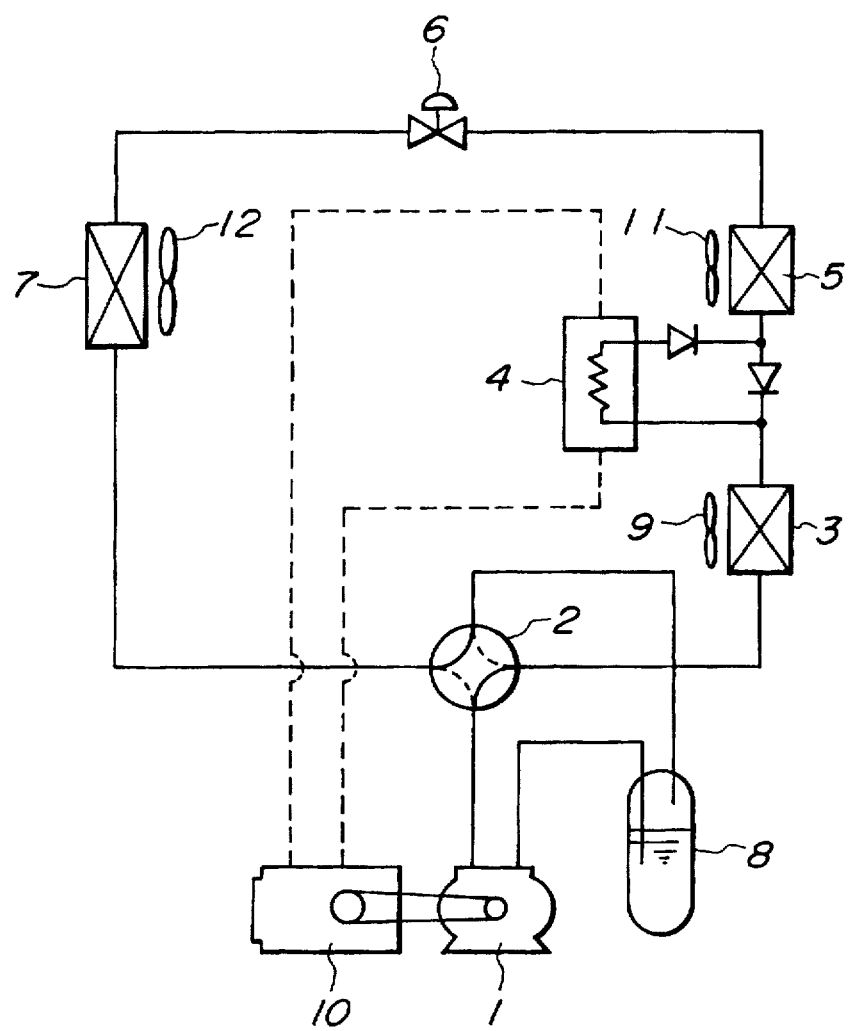
FIG. 21 is a schematic view which shows a construction of a conventional heat-pump type air conditioner for a vehicle.
Figure 22:
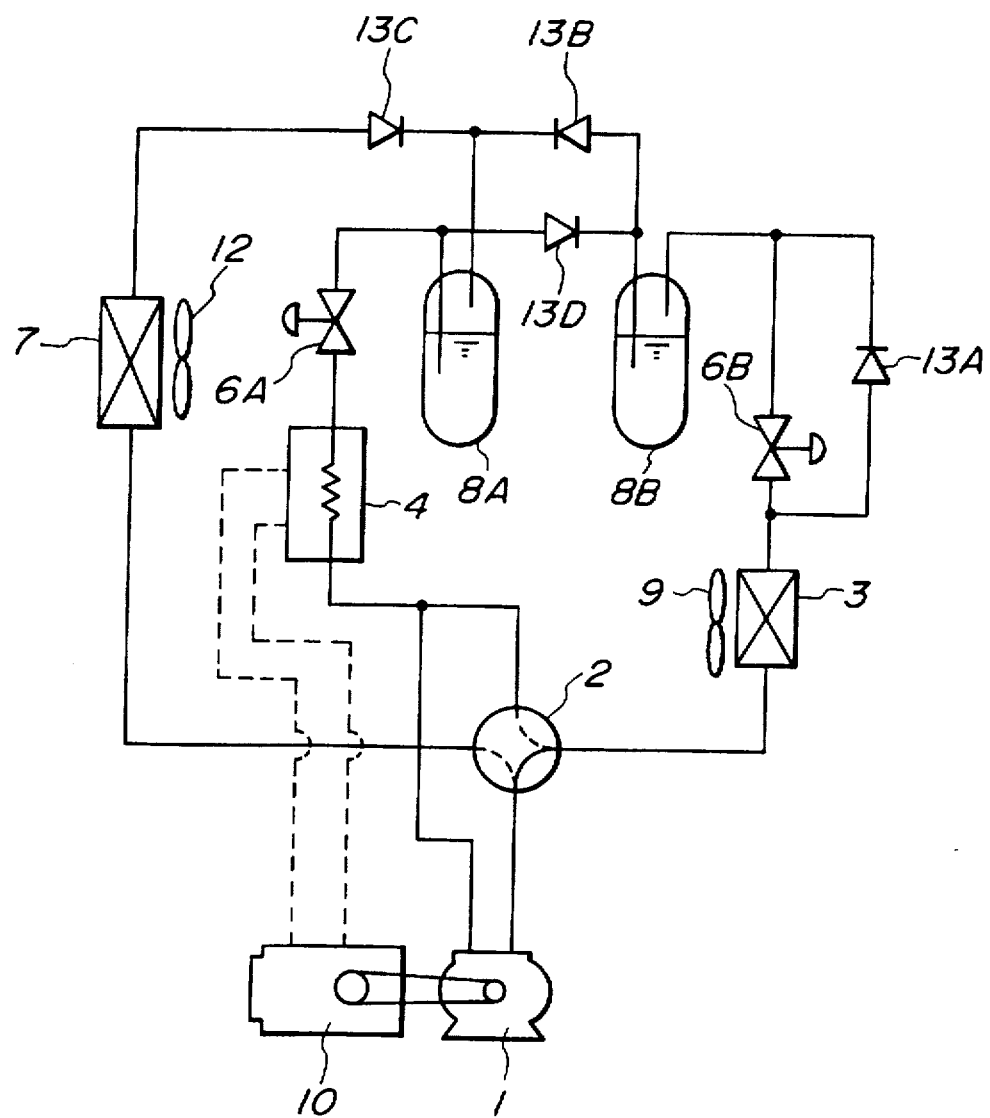
FIG. 22 is a schematic view which shows a construction of another conventional heat-pump type air conditioner for a vehicle.

Referring to FIG. 20, there is shown an eighth embodiment of the air conditioner according to the present invention. The construction of the eighth embodiment is generally similar to the of the sixth embodiment except that a PTC heater unit 313 is installed in the pressure container 302.

As shown in FIG. 20, the PTC heater unit 313 for heating the liquid-phase refrigerant is installed at a lower portion in the pressure container 302. This arrangement of the PTC heater 313 enables the liquid phase refrigerant located at the lower portion in the pressure container 302 to be effectively heated even if the gas-phase refrigerant is in the pressure container 302.

Although the preferred embodiments of the present invention have been shown and described such that the refrigerant heating means is disposed at both of the refrigerant inlet side and the refrigerant outlet side of the heat-absorbing inner heat exchanger 35, it will be understood that the refrigerant heating means may be disposed at either the refrigerant inlet side or the refrigerant outlet side of the heat-absorbing inner heat exchanger 35.

What is claimed is:

1. A heat pump type air condition for a vehicle, comprising:

refrigerant;

a compressor applying workload to said refrigerant;

an outer heat exchanger connected to a refrigerant discharge side of said compressor and radiating heat of said refrigerant into ambient air;

a blower leading air for air-conditioning a passenger compartment of the vehicle;

a heat-radiating inner heat exchanger connected to the refrigerant discharge side of said compressor and transmitting the heat of said refrigerant to the air led by said blower;

an expansion valve connected to a refrigerant outlet side of said heat-radiating inner heat exchanger;

a heat-absorbing inner heat exchanger connected to a refrigerant outlet side of said expansion valve and a refrigerant suction side of said compressor, said heat-absorbing inner heat exchanger cooling the air led by said blower by transmitting the heat of the air to said refrigerant which is supplied through said expansion valve from at least one of said outer heat exchanger and said heat-radiating inner heat exchanger;

a switching device disposed among the refrigerant discharge side of said compressor, a refrigerant inlet side of said outer heat exchanger and a refrigerant inlet side of said heat-radiating inner heat exchanger, said switching valve leading said refrigerant from said compressor to said outer heat exchanger during cooing operation and leading said refrigerant from said compressor to said heat-radiating inner heat exchanger while by passing said outer heat exchanger during heating operation;

refrigerant heating means for heating said refrigerant, said refrigerant heating means disposed to both of the refrigerant inlet side and the refrigerant outlet side of said heat-absorbing inner heat exchanger;

said refrigerant heating means including an upstream refrigerant heater which is disposed between said heat-radiating inner heat exchanger and said heat-absorbing inner heat exchanger and a downstream refrigerant heater which is disposed between said heat-absorbing inner heat exchanger and said compressor;

refrigerant condition detecting means for detecting a temperature of said refrigerant; and control means for turning on said refrigerant heating means detected by said refrigerant condition detecting means is lower than a predetermined valve during a warm-up operation in a heating mode.

2. A heat pump type air conditioner as claimed in claim 1, wherein:

said refrigerant condition detecting means includes a heat-radiating inner heat exchanger outlet-refrigerant temperature sensor which is disposed on a conduit connected to the outlet side of said heat-radiating inner heat exchanger and a heat-absorbing inner heat exchanger inlet-refrigerant temperature sensor which is disposed between the upstream refrigerant heater and said heat-absorbing inner heat exchanger.

3. A heat pump type air conditioner for a vehicle, comprising:

refrigerant;

a compressor applying workload to said refrigerant;

an outer heat exchanger connected to a refrigerant discharge side of said compressor and radiating heat of said refrigerant into ambient air;

a blower leading air for air-conditioning a passenger compartment of the vehicle;

a heat-radiating inner heat exchanger connected to the refrigerant discharge side of said compressor and transmitting the heat of said refrigerant to the air led by said blower;

an expansion valve connected to a refrigerant outlet side of said heat-radiating inner heat exchanger;

a heat-absorbing inner heat exchanger connected to a refrigerant outlet side of said expansion valve and a refrigerant suction side of said compressor, said heat-absorbing inner heat exchanger cooling the air led by said blower by transmitting the heat of the air to said refrigerant which is supplied through said expansion valve from at least one of said outer heat exchanger and said heat-radiating inner heat exchanger;

a switching device disposed among the refrigerant discharge side of said compressor, a refrigerant inlet side of said outer heat exchanger and a refrigerant inlet side of said heat-radiating inner heat exchanger, said switching valve leading said refrigerant from said compressor to said outer heat exchanger during cooling operation and leading said refrigerant from said compressor to said heat-radiating inner heat exchanger while bypassing said outer heat exchanger during heating operation;

refrigerant heating means for heating said refrigerant, said refrigerant heating means including an upstream refrigerant heater which is disposed upstream of said heat-absorbing inner heat exchanger and a downstream refrigerant heater which is disposed downstream of said heat-absorbing inner heat exchanger;

refrigerant condition detecting means for detecting the condition of said refrigerant, said refrigerant condition detecting means including first, second, third and fourth thermal-properly detectors which are disposed at a refrigerant inlet side and a refrigerant outlet side of the upstream refrigerant heater, a refrigerant inlet side and a refrigerant outlet side of the downstream refrigerant heat, respectively; and control means for turning on said refrigerant heating means according to the condition of said refrigerant which is detected by said refrigerant condition detecting means.

\* \* \* \* \*